INVENTORS
DAVID T. DAVIS
WILLIAM WOODS-HILL
BY A. J. Etienne
ATTORNEY

INVENTORS
DAVID T. DAVIS
WILLIAM WOODS-HILL
BY A. J. Etienne
ATTORNEY

INVENTORS
DAVID T DAVIS
WILLIAM WOODS-HILL
BY A. J. Etienne
ATTORNEY

March 1, 1955 W. WOODS-HILL ET AL 2,703,201

ELECTRONIC DIVIDER

Filed March 3, 1950 8 Sheets-Sheet 4

INVENTORS
DAVID T. DAVIS
WILLIAM WOODS-HILL
BY A. J. Etienne
ATTORNEY

INVENTORS
DAVID T. DAVIS
WILLIAM WOODS-HILL
BY A. J. Etienne
ATTORNEY

March 1, 1955 W. WOODS-HILL ET AL 2,703,201

ELECTRONIC DIVIDER

Filed March 3, 1950 8 Sheets-Sheet 6

INVENTORS
DAVID T DAVIS
WILLIAM WOODS-HILL
BY A. J. Etienne
ATTORNEY

March 1, 1955 W. WOODS-HILL ET AL 2,703,201

ELECTRONIC DIVIDER

Filed March 3, 1950 8 Sheets-Sheet 7

INVENTORS
DAVID T. DAVIS
WILLIAM WOODS-HILL
BY A. J. Etienne
ATTORNEY

March 1, 1955 W. WOODS-HILL ET AL 2,703,201

ELECTRONIC DIVIDER

Filed March 3, 1950 8 Sheets-Sheet 8

INVENTOR
DAVID T. DAVIS
WILLIAM WOODS-HILL
BY A. J. Etienne
ATTORNEY

United States Patent Office
2,703,201
Patented Mar. 1, 1955

2,703,201

ELECTRONIC DIVIDER

William Woods-Hill, Letchworth, and David T. Davis, Wandsworth Common, London, England, assignors to International Business Machines Corporation, New York, N. Y., a corporation of New York Application March 3, 1950, Serial No. 147,442
Claims priority, application Great Britain March 24, 1949
34 Claims. (Cl. 235—61)

The present invention relates to an electronic dividing device and more particularly to a device utilizing the principle of duplation.

It is possible to express a number $x$ in terms of any other number $y$ as the sum of a series of terms of the general form.

$$x=a2^0y+a2^{-1}y+a2^{-2}y+a2^{-3}y \dots +a2^1y+a2^2y+a2^3y \dots$$

where each $a$ may have the value 1 or 0.

This series will contain a finite number of terms if the quotient of $x$ divided by $y$ is commensurable and an infinite number of terms if the quotient is incommensurable. However, the series converges comparatively rapidly, so that it is possible to obtain any required degree of accuracy by considering a reasonable number of terms of the series.

The above expression may be re-arranged in the form:

$$\frac{x}{y}=a2^0+a2^{-1}+a2^{-2}+a2^{-3} \dots +a2^1+a2^2+a2^3 \dots$$

Thus, the quotient of $x$ divided by $y$ is obtained. The value of the coefficient $a$ for each term may be determined by subtracting each term $a2^0y$ etc. from the value of $x$, or its remainders, commencing with the highest value term. If the remainder or sub-remainder is positive, $a$ is 1, if negative, $a$ is 0. For example, it may be required to find the quotient of 123 divided by 7. The term $2^5.7$ has the value 224 which is greater than 123 while $2^4.7$ has a value of 112 which is less than 123 so that no term with a coefficient greater than $2^4$ can appear in the series. The calculation of the quotient may be tabulated as follows:

| Term of series | Dividend | Value of $a$ | Quotient |
|---|---|---|---|
| $2^4.7$ (112.0) | 123.000000 | 1 | 16.0 |
| | 112.000000 | | |
| | 11.000000 | | |
| $2^3.7$ (56.0) | | 0 | |
| $2^2.7$ (28.0) | | 0 | |
| $2^1.7$ (14.0) | | 0 | |
| $2^0.7$ (7.0) | 7.00000 | 1 | 1.0 |
| | 4.00000 | | |
| $2^{-1}.7$ (3.5) | 3.500000 | 1 | .5 |
| | .500000 | | |
| $2^{-2}.7$ (1.75) | | 0 | |
| $2^{-3}.7$ (.875) | | 0 | |
| $2^{-4}.7$ (.4375) | .437500 | 1 | .0625 |
| | .062500 | | |
| $2^{-5}.7$ (.21875) | | 0 | |
| $2^{-6}.7$ (.109375) | | 0 | |
| $2^{-7}.7$ (.0546875) | .0546875 | 1 | .0078125 |
| | .0078125 | | 17.5703125 |

Since the quotient of 123 divided by 7 is 17.571, correct to three decimal places as obtained by direct division, the value obtained by taking terms with coefficients from $2^4$ to $2^{-7}$ in the series turns out to be correct to two decimal places. Greater accuracy would be obtained by extending the number of terms considered.

Thus an object of the invention is to provide an electronic dividing device which operates by forming a series of ascending binary multiples of the divisor and attempting successive subtraction of successive descending binary multiple values from the dividend value.

According to the invention, an electronic dividing machine including tube counters for registering a divisor (DR), a dividend (DD) and a quotient (Q) and a tube pulse emitter, is characterized by means to double repeatedly the said registered divisor value until it is numerically greater than the greatest dividend value which can be registered, means to halve repeatedly thereafter the said repeatedly doubled divisor value, means to effect transfer of each repeatedly halved divisor value to the dividend counter to effect subtraction of the divisor value from the value registered in the said counter, and if the said subtraction will result in a positive remainder, employing means for forming and summing in the quotient counter a plurality of terms of the binary series, the said sum being the quotient value.

In the preferred form of the invention, the electronic dividing machine includes a pulse emitter, a divisor counter, the value registered in which may be either halved or doubled, a dividend counter, and a quotient counter, the value registered in which may be doubled, and means for comparing the values standing in the divisor and dividend counter. The divisor value is first doubled successively until it is greater numerically than the dividend. The divisor is then halved successively, and at each halving operation, the value is compared with the dividend value, and if it is less, it is subtracted from the dividend value. Each time a subtraction is effected, "1" is entered in the quotient counter, and each time the divisor value is halved, the quotient value is doubled.

Throughout the specification the term "tube" will be used to indicate thermionic tubes of the high vacuum type.

Other objects of the invention will be pointed out in the following description and claims and illustrated in the accompanying drawings, which disclose, by way of examples, the principle of the invention and the best mode, which has been contemplated, of applying that principle.

The invention will now be described, by way of example, with reference to the accompanying drawings, in which:

Figures 1 and 1*a*, with 1*a* at the right comprise a circuit diagram in block form of the complete dividing machine.

Figure 2 is a circuit diagram of the cycle counter 8 of Figure 1 and of element 31 of Figure 1.

Figures 3 and 3*a*, with 3*a* at the right, comprise a composite circuit diagram showing one denomination of the divisor counter 2 of Figure 1, one denomination of the dividend counter 1 of Figure 1 and the related parts of the comparison circuit 4 of Figure 1.

Figures 4 and 4*a* form a timing diagram in which the positive or negative nature of the pulse is ignored to sharpen the time comparisons.

Figure 1:
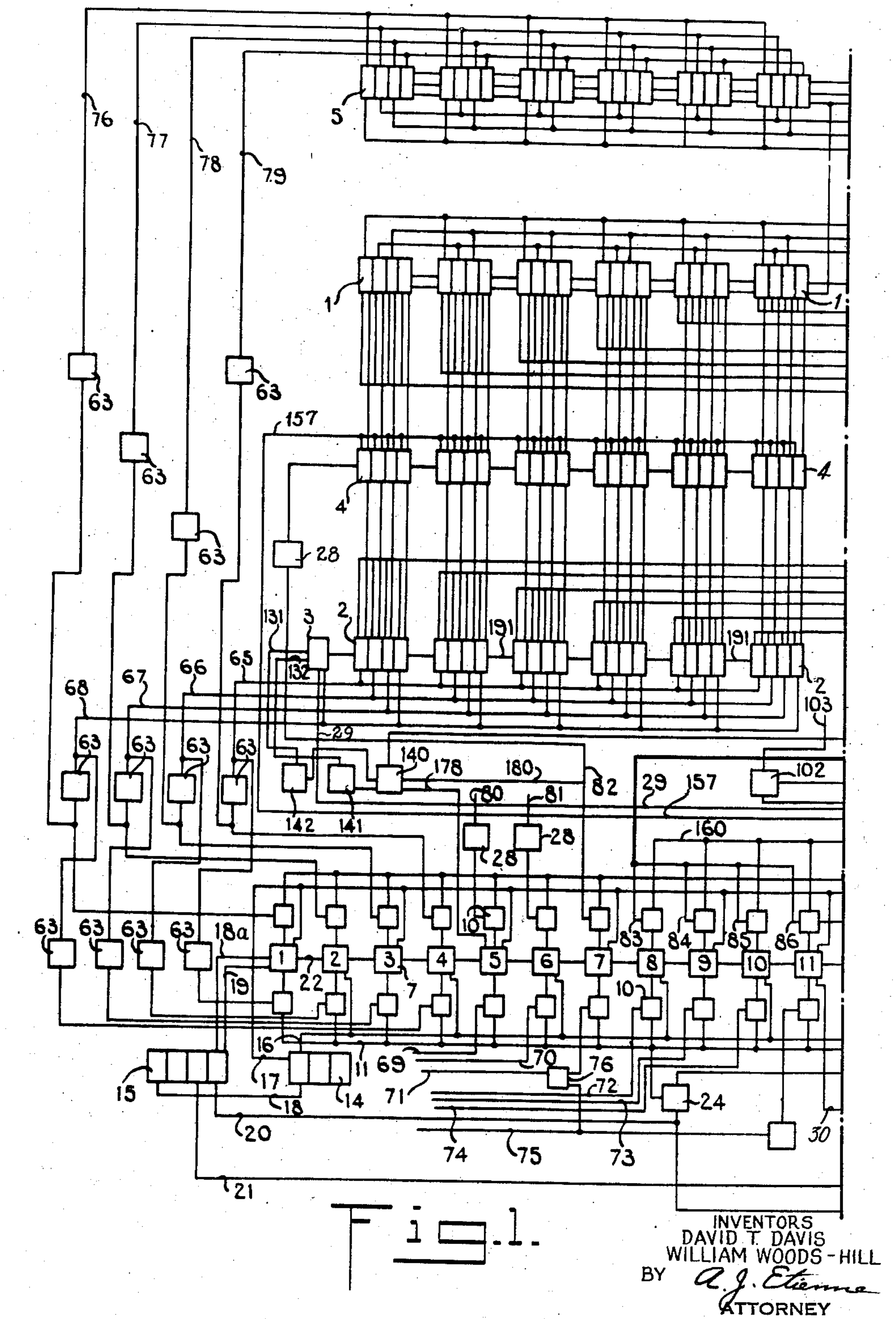

In our copending application Serial No. 147,441 filed March 3, 1950, there is disclosed an electronic multiplying machine employing the principle of halving and doubling. The present invention employs certain circuits described briefly herein which are generally similar to those described in said application, to which reference may be had for a more detailed description of such circuits.

The term "trigger stage" or simply "trigger" will be used herein to denote a circuit well known in the art, comprising two tubes so cross-coupled that the circuit has two mutually exclusive stable states. In the drawings, unless otherwise stated, the left hand tube of each trigger is assumed to be conductive and the right hand tube to be non-conductive when the trigger is "off." When "on," the conductive conditions of the respective tubes are reversed.

The term "gate tube" or simply "gate" will be used to denote a multi-electrode tube or its equivalent so connected that a voltage change applied to one control electrode may be prevented from affecting an output electrode by the application of a voltage to a second control electrode. An example of such a gate is a pentode in which a voltage impulse is applied to the control grid and in which the voltage of the suppressor grid determines whether or not a corresponding voltage impulse appears at the anode.

GENERAL

Figure 1A:
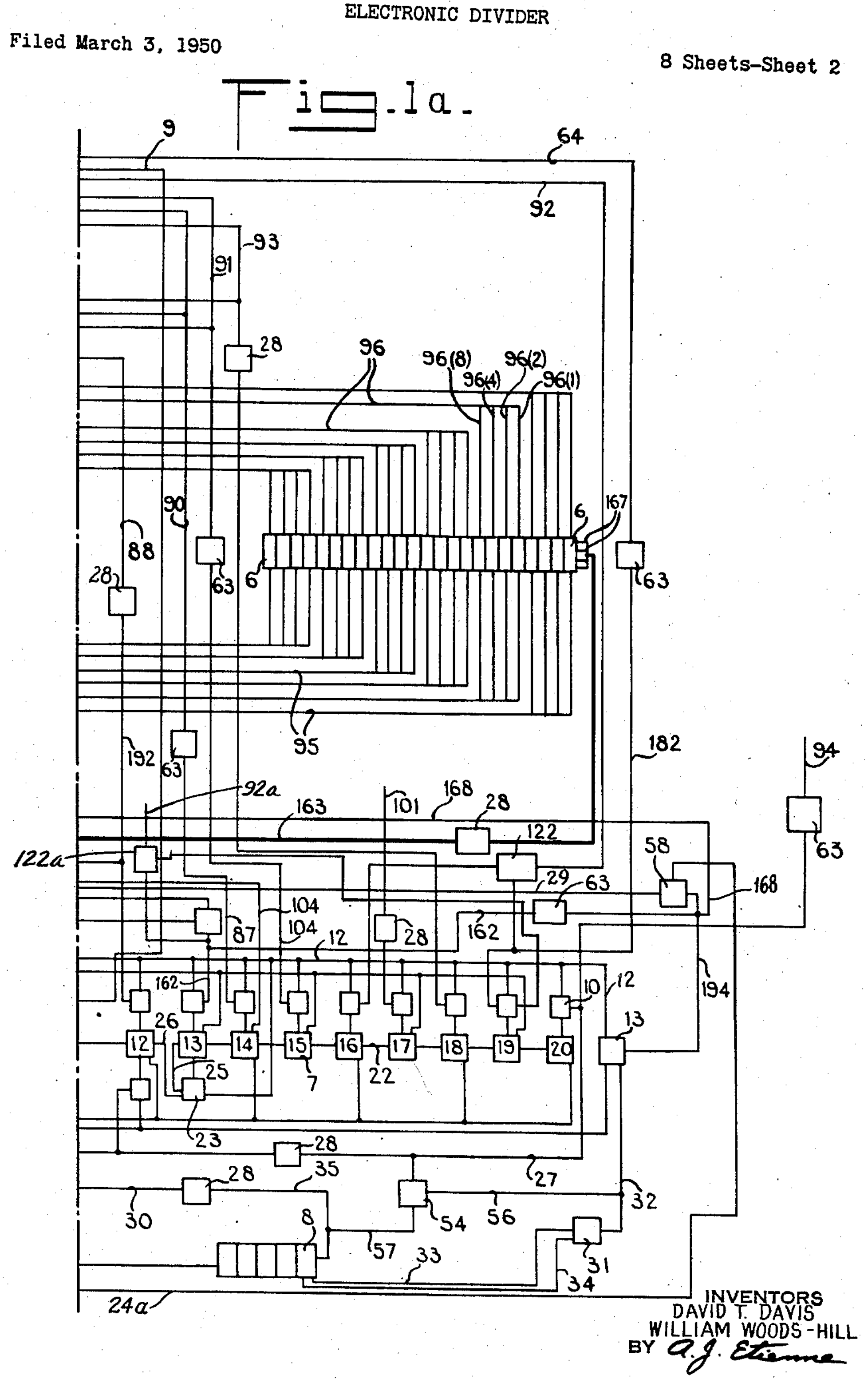

Figures 1 and 1*a* comprise a block diagram of an all electronic dividing device constructed according to the invention and designed to divide a three digit dividend by a three digit divisor to give a six digit quotient to three decimal places.

The dividend counter 1 (Figure 1) comprises six decimal denominations. The dividend value is entered with the units value in the fourth denomination (counting from the right) of the counter, the tens in the fifth denomination, and the hundreds in the sixth or extreme left denomination. The divisor counter 2 is also of six denominations and the divisor value is entered in the usual manner, that is, with the units in the extreme right hand denomination of the counter.

The divisor counter 2 is provided with an overflow indicator 3 which is operated when the value standing in the counter exceeds six denominations.

Corresponding denominations of the divisor and dividend counters are connected to groups of comparing units 4, which are connected in chain fashion within a group. This comparer indicates when the divisor value is greater than the dividend value and therefore cannot be subtracted from it to leave a positive remainder.

The quotient counter 5 likewise consists of six denominations. The operation is such that the first three denominations on the right record the decimal part of the quotient and the remaining denominations record the whole number part of the quotient. Whenever the divisor value is entered into the dividend counter 1, through the transfer valves 6, an entry of one is made into the quotient counter by a pulse on the line 9.

The pulse emitter which controls the operation of the divider comprises twenty successively numbered units, generally indicated as 7. Associated with each unit 7 is a pair of gates 10. The operation of these gates is controlled by a switch control unit 13, via lines 11 and 12. When the switch control unit is in one stable state, line 11 renders its associated gates 10 operative and when in the other stable state, line 12 renders its associated gates 10 operative. For convenience of reference, the gates 10 connected to line 11 will be designated by suffix A added to a sequence designating number so that gate 10 (5A) is that gate 10 of the fifth emitter unit connected to line 11. The gates 10 connected to line 12 will be designated by the suffix B.

PULSE GENERATOR AND START UNITS

A multivibrator and trigger unit is indicated as 14 in Figure 1, and a start unit by 15. These units are like those in the multiplier described in our above cited copending application, to which reference may be had for a detailed description.

Figure 4:
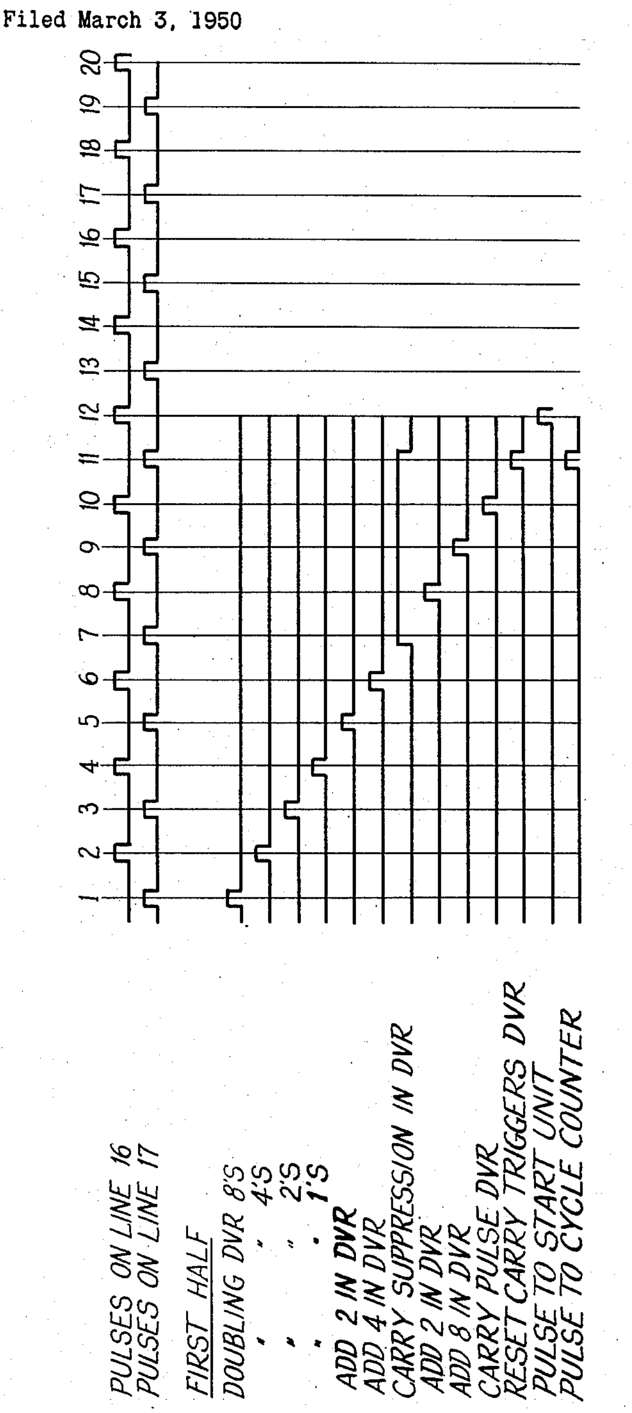

Generally unit 14 comprises a free running multivibrator, the output from which is applied to a single trigger stage as in said copending application. From each anode of the trigger stage, the resulting square wave is applied through a differentiating circuit to the grids of two triodes of the unit 14 which are normally biased below cut off, so that negative pulses appear at the triode anodes which are applied to lines 16 and 17 as indicated in reverse phase in Figure 4. Since the pulses from one triode are derived from one half of the square wave, and the pulses from the second triode from the other half of the square wave, the pulses occur alternately on lines 16 and 17. A series of positive pulses is also supplied by unit 14 via line 18 to the start unit 15.

When the start unit is brought into operation by any well known manner as for example by the closing of a key or relay contact, the positive pulses from line 18 are fed through a pentode gate tube to a trigger stage as in said co-pending application which is thereby switched to the "on" state. The output pulse from this trigger stage is applied to a second trigger stage, causing this stage to switch "on." The resulting negative pulse is applied via line 18*a* to the first stage 7 (1) of the pulse emitter to be described presently. The fact that the second trigger stage of unit 15 is in the "on" state causes the suppressor grid of a pentode gate tube as in said copending application to be brought from below cut off to cathode potential. Line 20 is connected to the control grid of this pentode, so that a positive pulse on this line 20 will, under these conditions, produce a negative pulse, at the anode, which will also go via line 19 to the unit 7 (1) to initiate any further operations of the emitter, as described later. A negative pulse produced on line 21 as described later will switch the second trigger stage of unit 15 "off," thereby reducing the suppressor grid potential of its gate tube and preventing the production of further pulses on line 19 to thus prevent further operation of the emitter, at the end of dividing.

PULSE EMITTER

This consists of the 20 units 7 (1) to 7 (20) and the associated gates 10. The construction and functioning of this unit is the same as that of the emitter described in our copending application except for the differences noted herein and instant device, with said differences, is shown and claimed in applicants' divisional application Serial No. 202,918, filed December 27, 1950, now Patent 2,623,171.

Each of the units 7 comprises a trigger stage from one anode of which a capacitative connection is made to the control grid of the associated gate or gates 10. The suppressor grids of the respective gates are connected to line 11 or to line 12. All the trigger stages of the units 7 are normally "off."

When a negative pulse is applied to unit 7 (1) via line 18*a* to initiate a dividing operation as described above, unit 7 (1) is switched "on." The next pulse produced on line 17 after this time by the MV unit 14, causes unit 7 (1) to switch "off" again. This switching "off" produces a negative pulse, which, via line 22, switches unit 7 (2) "on," and also produces a positive pulse, which, applied to the control grid of the gates 10 (1A) and 10 (1B) produces a negative pulse at one or the other of the anodes determined by the different potentials of the lines 11 and 12. If line 11 is the one at approximately ground potential gates 10 (1A), 10 (2A), etc. will produce negative pulses.

Unit 7 (2) will be switched "off" by the next pulse produced on line 16 by the MV unit 14 and in going "off" will switch "on" unit 7 (3). In this manner, the separate units 7 will be switched "on" then "off," progressively along the chain after initiation of the dividing operation.

It is to be noted that there is a connection from the gate 10 (12A) to a further gate 24. When unit 7 (12) switches "off," the gate 10 (12A) will pass a negative pulse to gate 24, which will also be operative, since its suppressor grid is connected to line 11, so that a positive pulse will thus be sent via line 20 to the start unit 15 and thence as a negative pulse via line 19 to unit 7 (1) to switch it "on" and commence another cycle of pulse emitter operation.

It is also to be noted that emitter unit 7 (12) is connected to emitter unit 7 (13) only via line 26 and a gate tube 23 which has its suppressor grid connected to line 12. Since line 12 is at this time considerably negative with respect to ground, gate 23 is inoperative and no pulse is transmitted from the anode of 23 via line 25 to switch emitter unit 7 (13) "on," so that units 7 (13) to 7 (20) are not operated, at this time. The line 26 is connected to the opposite anode to that to which the lines 22 are connected, to provide a pulse of the correct polarity.

When, however, the switch control unit 13 is in the other stable state, line 12 will at that time be near ground potential so that the B gate tubes will be operative, together with tube 23, while gate 10 (12A) will be inoperative. Thus, under these conditions the pulse from unit 7 (12) will switch "on" emitter unit 7 (13) and the switching will proceed successively along the entire chain to unit 7 (20) which in switching "off" will via 20 (10B) produce a pulse which, via line 27, amplifier 28, gate tube 24, line 20 and start unit 15, will switch "on" unit 7 (1) to commence a new emitter cycle. Thus when the switch control unit 13 is in one state, the emitter cycle is from unit 7 (1) to unit 7 (12) and back to 7 (1) again, and when in the other state from unit 7 (1) to unit 7 (20) and back to 7 (1).

CYCLE CONTROL

The number of cycles performed by the pulse emitter is determined by the overflow indicator 3 and the cycle counter 8 acting together. The switch control unit 13 consists of a trigger stage similar to the half cycle control unit described in our above cited copending application. In the normal "off" state of the trigger stage of unit 13, the line 11 is held at approximately ground potential, and the line 12 negative with respect to ground, so that the gate tubes 10A connected to line 11 are operative.

At the very beginning of the dividing operation, the emitter cycles from unit 7 (1) to unit 7 (12). The pulses from the related gate causes the value registered in the divisor counter to be successively doubled, one such doubling operation taking place for each cycle of the emitter, as will be described in more detail later. After a number of cycles required for the successively doubled DR value to overflow its storage which of course is dependent upon the original value of the divisor, the overflow indicator 3 is flipped. This indicator consists of a trigger stage similar to those employed in the divisor counter, and it may in fact be considered as the first stage of a seventh denomination of this counter. However, a line 29 is connected in a well known manner to a potentiometer extending from the left hand anode of this trigger stage to a negative bias line so that when this overflow switches "on," the potential of line 29 is made less negative. This conditions gate 58 so that a plus pulse from unit 10 (12A) via 24 and over line 24*a* renders 58 operative. Thus the positive pulse applied to gate 58 from line 24*a* is inverted to a negative pulse, which is applied to the switch control unit trigger stage 13 via line 194 to switch it "on." With switch unit 13 "on," and via the pulse transmitted via 24 and line 20 to the start unit 15, the emitter starts its second or long cycle of operation, in which all the units 7 (1) to 7 (20) are used and the gate valves 10B are operative.

During the doubling of the DR value which is called the first part of the division operation, for each short cycle of emitter operation, a positive pulse is transmitted via line 30 and amplifier valve 28 to the cycle counter 8. This counter is adapted to perform addition or subtraction, and at this time is conditioned for adding. Thus the total number of cycles during the first part of the operation is registered positively in the counter.

When the switch control unit 13 goes "on," a negative pulse is transmitted via line 32 to the trigger stage 31 (shown as V45 in Fig. 2), which thereupon switches "on." This has the effect of altering the potentials of the lines 33 and 34, which thus conditions counter 8 for subtraction as described presently. Thus the pulses which are thereafter transmitted to the cycle counter 8 via line 30 are subtracted from the value already registered. During this time, the DR value is halved and this is called the second part of the division operation. When the counter passes through zero, indicating that the numbers of cycles performed in both parts of the operation are equal, a negative pulse is transmitted via line 21 to the start unit 15. As stated above, this blocks the transmission of pulses via line 20 to line 19 and thus terminates emitter operation.

CYCLE COUNTER

Figure 2:
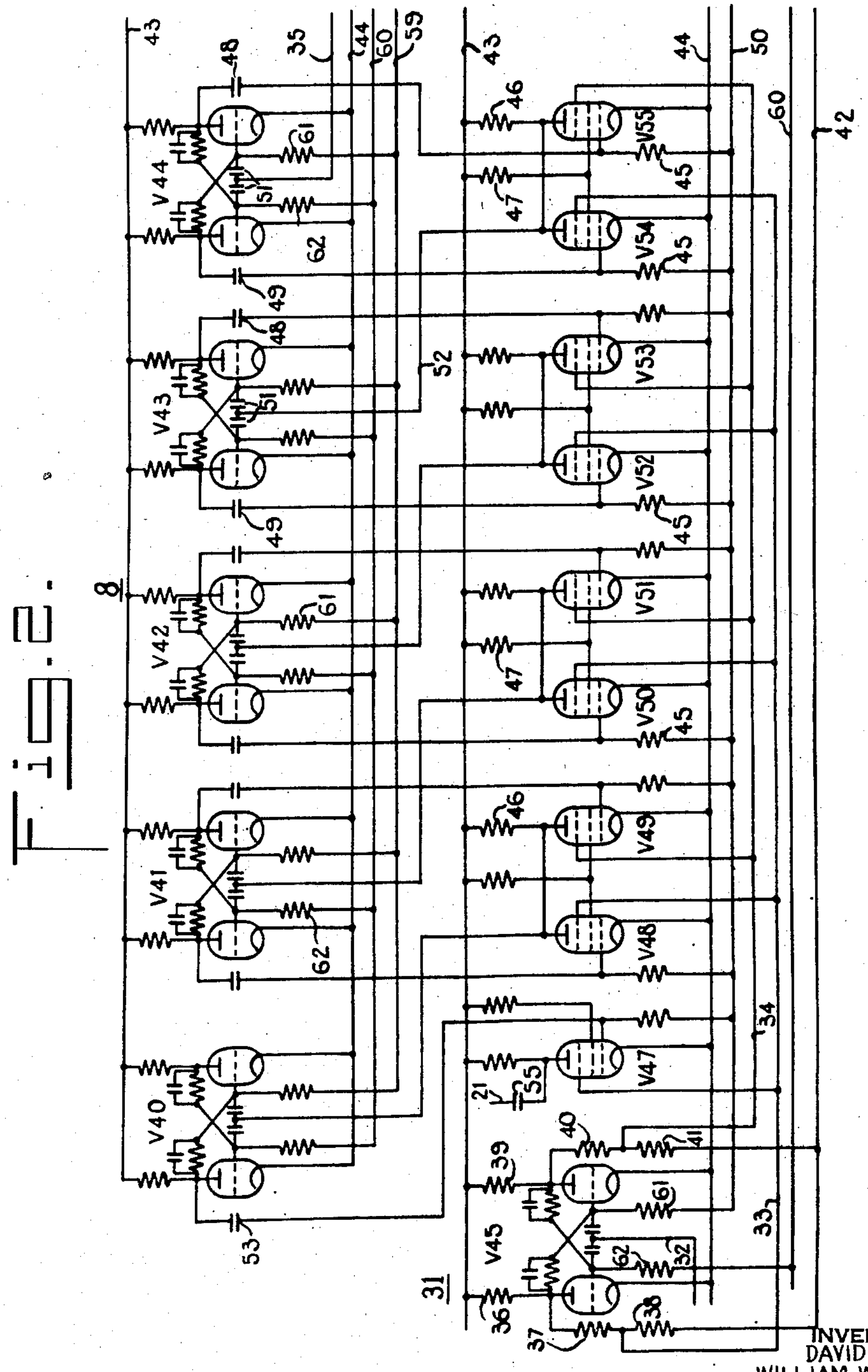

The cycle counter generally indicated as 8 in Figure 1 is shown in detail in Figure 2. It comprises five trigger stages V40 to V44, which form a straight binary counter counting to 32. Each trigger stage may comprise a twin triode valve such as a type 6SN7.

The trigger stage V45 of Fig. 2 is indicated generally as 31 in Figure 1 and controls the relative potentials of the lines 33 and 34. Resistors 36, 37, 38 and 39, 40, 41, form two potentiometers between the H. T. line 43 and the negative supply line 42. As stated above generally for all triggers in the normal or "off" state, the left hand valve of trigger V45 is conducting and the right hand valve non-conducting so that the junction point of resistors 37 and 38, and hence line 33, is considerably negative with respect to the ground potential line 44. The suppressor grids of pentodes V47, V48, V50, V52 and V54, connected to line 33, will thus be held below cut-off and any pulses applied to their control grids will not appear at their anodes. On the other hand, the junction point of resistors 40 and 41, and hence line 34 is at approximately the potential of line 44. However, when trigger stage V45 flips "on," the potentials of lines 33 and 34 relative to line 44, will be reversed. A more detailed description of a trigger stage similar to V45 will be found in the above cited copending application.

Each of the trigger stages V41 to V44 has two pentodes associated with it serving as gates. Thus trigger stage V44, which is the first stage of the counter, has associated with it the gate pentodes V54 and V55. The control grids of the gates are connected to the negative bias supply line 50 through individual resistors 45. The screen grids are commoned and connected to the H. T. line 43 through a resistor 47. The anodes are commoned and connected through a resistor 46 to the H. T. line.

The left hand anode of trigger V44 is connected via condenser 49 to the control grid of gate V54 and its right hand anode is similarly connected via condenser 48 to V55. The first positive pulse fed via line 30 from emitter unit 7 (11) (Figure 1) to amplifier 28 is inverted to a negative pulse and applied via line 35 (Figure 2) to the grids of trigger V44 (Figure 2) through the condensers 51, causing V44 to switch "on." The right-hand half of V44 then becomes conducting so that a negative pulse is applied via condenser 48 to the control grid of V55 which is ineffective, since the grid is already below cut off due to the connection to the bias line 50. A positive pulse is applied via condenser 49 to the control grid of V54 but cannot produce a pulse at the anode since the suppressor grid is held below cut off by line 33.

A second pulse on line 35 switches V44 "off," which produces a positive pulse at the grid of V55 that appears as a negative pulse at the anode and is transmitted via line 52 and condensers 51 to the grids of V43 to switch this stage "on."

On the fourth pulse, a positive pulse will again be transmitted to V55, the negative pulse from the anode of which will switch V43 "off." This will cause a positive pulse at the right hand anode of V43, which, via condenser 48, will be applied to V53. The resulting negative pulse will then switch "on" V42. The remaining stages operate in similar manner, so that it will be appreciated that the trigger stages V44 to V40 will operate as an adding counter operating in the binary system.

As already explained, when the divisor counter "overflows" and flips switch control trigger 13 so that a negative pulse is produced on line 32 (Figures 1 and 2), which switches V45 (31 of Figure 1) to the "on" state so that the potentials of lines 33 and 34 are changed over rendering tubes V49, V51, V53 and V55 inoperative by the suppressor grid bias, then pentodes V47, V48, V50, V52, and V54 are now rendered operative. These latter pentodes on receipt of a positive pulse from their associated counter trigger stage will transmit a negative pulse to cause switching of the next higher counter trigger stage. However, since their control grids are connected through condensers 49 to the left hand anode of the related trigger stages, they will receive a positive pulse when the trigger stage goes "on," whereas the other set of gates received a positive pulse when the trigger stages switched "off." This change has the effect of causing further pulses on line 35 to effect subtraction from the value already registered in the counter.

The process of subtraction may be illustrated by a table showing the states of the various trigger stages, the "on" state of a trigger being indicated by "X" and the "off" state by "—." It will be assumed by way of example, that twenty-one pulses were entered into the counter before trigger stage V45 was switched over to condition the counter for subtraction.

*Table I*

| | V40 | V41 | V42 | V43 | V44 | Value |
|---|---|---|---|---|---|---|
| Initial state | X | ----- | X | ----- | X | 21 |
| After 1st pulse | X | ----- | X | ----- | ----- | 20 |
| After 2nd pulse | X | ----- | ----- | X | X | 19 |
| After 3rd pulse | X | ----- | ----- | X | ----- | 18 |
| After 4th pulse | X | ----- | ----- | ----- | X | 17 |
| After 5th pulse | X | ----- | ----- | ----- | ----- | 16 |
| After 6th pulse | ----- | X | X | X | X | 15 |
| After 7th pulse | ----- | X | X | X | ----- | 14 |
| After 8th pulse | ----- | X | X | ----- | X | 13 |
| After 19th pulse | ----- | ----- | ----- | X | ----- | 2 |
| After 20th pulse | ----- | ----- | ----- | ----- | X | 1 |
| After 21st pulse | ----- | ----- | ----- | ----- | ----- | 0 |
| After 22nd pulse | X | X | X | X | X | ----- |

From the table, it is apparent that any trigger stage which switches "on," causes switching of the next higher trigger stage. For example, the sixth pulse on line 35 switches V44 "on," which, through V54, switches V43 "on," which, through V52, switches V42 "on," which, through V50, switches V41 "on," which, through V48, switches V40 "off."

The twenty-second pulse, as shown, causes all the trigger stages to switch "on." This results in a positive pulse being transmitted via condenser 53 to the control grid of gate valve V47, so that a negative pulse is produced at the anode and transmitted via condenser 55 and line 21 to the start unit 15 (Figure 1) to bring the operation to an end.

Since it is necessary that the number of cycles during the first and second parts of the dividing operation should be equal, in order to get this negative output pulse to stop the emitter an extra pulse must be fed to the counter during the second part of the dividing operation when subtraction occurs. This is effected by the trigger stage 54 (Figure 1). This trigger stage is similar to those employed in the counter, such as V44 for example, except that no connection is made to the junction of the condensers 51. Instead, line 32 is connected via line 56 and a condenser to one grid, and line 27 is connected via a condenser to the other grid. A connection is also made from the left hand anode via a condenser and line 57 to line 35. This trigger stage 54 is normally in the "off" state, but will be switched "on" by the pulse on lines 32 and 56 that switches "on" unit 31. At the end of the first long emitter cycle, the negative pulse on line 27 from emitter unit 7 (20) will switch "off" trigger stage 54. This will result in a negative pulse being transmitted by line 57 to the cycle counter 8, so that an additional "1" is subtracted from the value standing in the counter. The pulses on line 27 are only effective to switch trigger stage 54 from "on" to "off," so that only a single pulse will be produced during a complete dividing operation.

It will be noted that in Figure 2, the left hand grids of the various trigger stages are connected through resistors 62 to a bias line 60. The negative potential of this line may be reduced to forcibly reset all the trigger stages "off" before the beginning of a dividing operation. This method of resetting is used generally where it is necessary for a trigger stage to be reset at the end of the dividing operation.

The right hand grids of the trigger stages are connected to the bias line 59, through resistors 61, which is at a fixed negative potential.

DIVIDEND COUNTER

Figure 3:
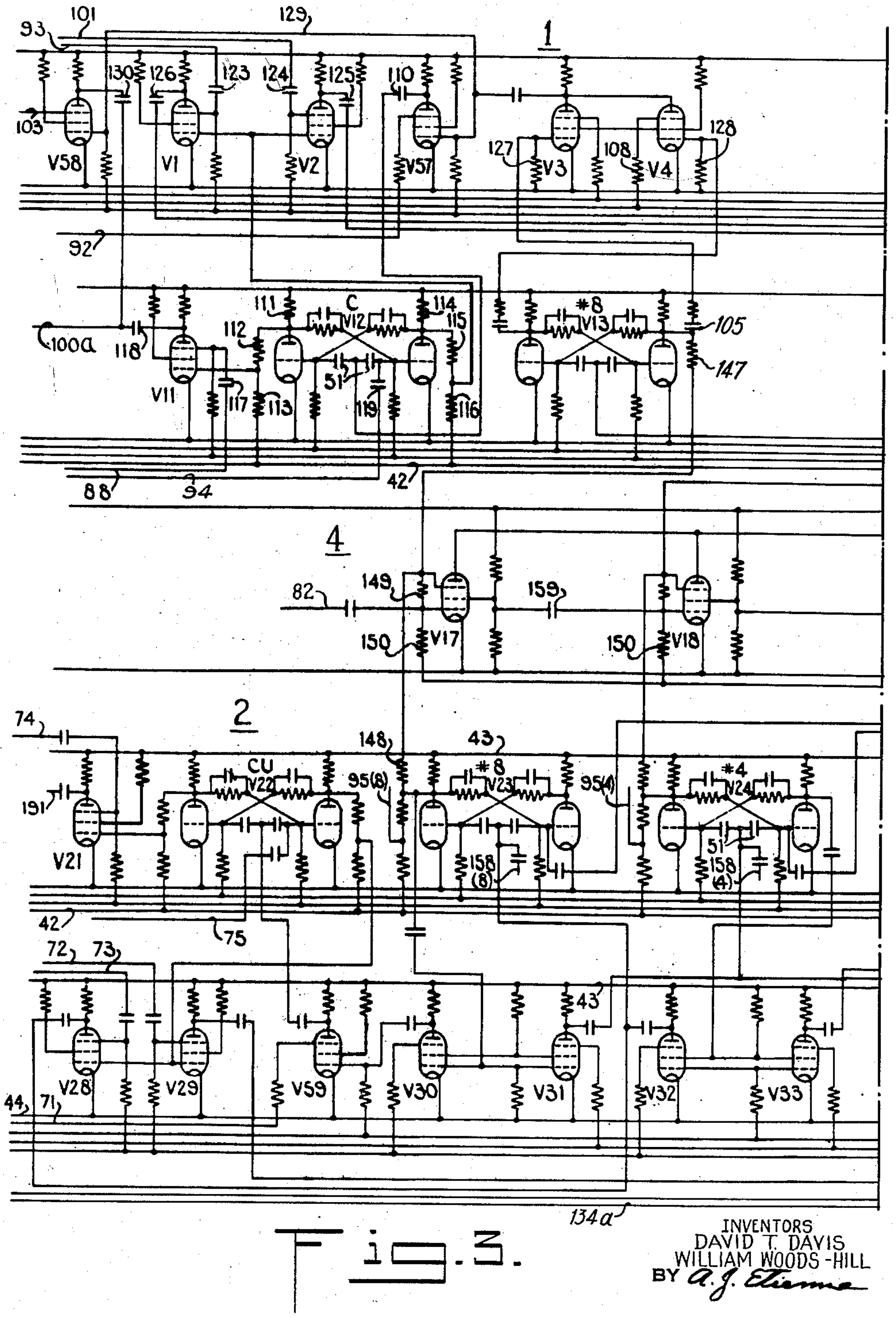
Figure 3A:
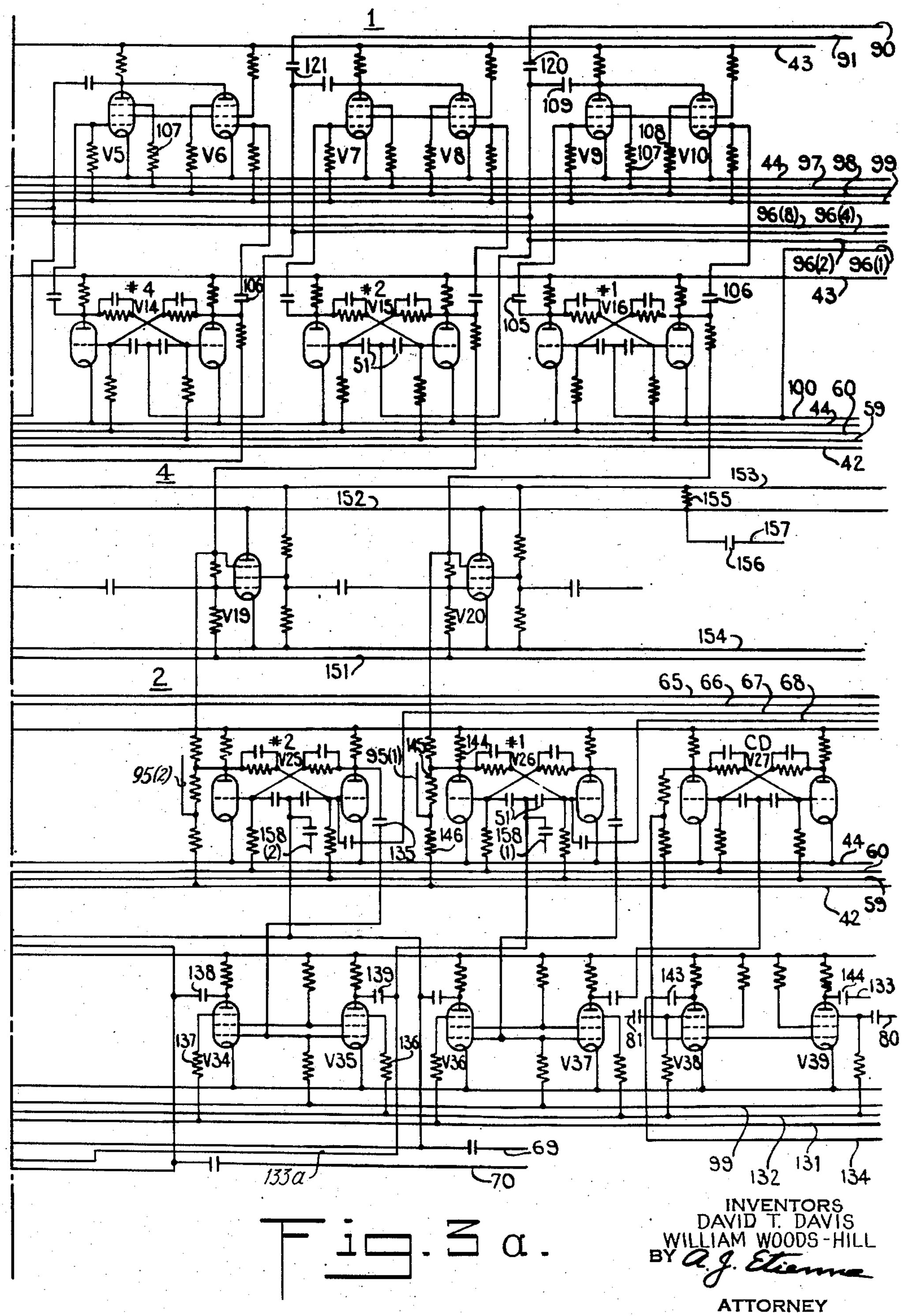

A detailed circuit diagram of one denomination of the dividend counter, indicated generally as 1 in Figure 1, is shown in the upper portions of Figures 3 and 3*a*. This comprises the tubes V1 to V16, V57 and V58. Also shown in Figures 3 and 3*a* (in the lower portion) is one denomination of the divisor counter comprising tubes V21 to V39 and V59, and in the center portion of Figures 3 and 3*a* the comparing circuit pentodes V17 to V20 related to a single denomination.

Referring to the dividend denomination the trigger stages V16 to V13 as indicated by the numbers #1, #2, #4, #8 represent these values. The trigger stage V12 (Fig. 3) is labeled C, to indicate that it is the carry trigger stage.

The dividend counter is operable as both an adding and subtracting counter and operates substantially like the cycle counter 8. Each denomination operates as a binary counter in the scale of 16 and is then corrected to read in the decimal scale. However, unlike the cycle counter, the values are not registered by applying a succession of pulses to the lowest value trigger and operating in cascade but instead by directly setting the appropriate triggers individually in each denomination. This might be termed a sidewise operation in contrast to the serially spilling over cascade operation of cycle counter 8.

During the actual dividing operation, the dividend counter always subtracts so that the gates V4, V6, V8 and V10, which permit the counter to add, are rendered inoperative, as described presently. However, by their provision, several values may be entered into the counter additively before starting division, as for example when the dividend is first calculated by summing a set of initial data.

Taking, by way of example, the #1 trigger V16 and the associated gates V9 and V10, it will be seen that the anodes of the trigger, like those in the cycle counter 8, are respectively connected through condensers 105 and 106 to the control grids of pentodes V9 and V10. The suppressor grid of V9 is connected via resistor 107 to line 97 whose potential is controlled like that of line 34 in Figure 2. If this line is at approximately the same potential as line 44, which is the condition for subtracting, then when V16 switches "on," a positive pulse will be transmitted via condenser 105 to the control grid of pentode V9, which is connected via a resistor to the bias line 99, and will produce a negative pulse at the anode, which, via condenser 109 and the condensers 51, will be applied to the control grids of the #2 trigger V15 to switch it "on." Conversely, if line 97 is negative and line 98 is at the potential of line 44, which is the condition for adding, then pentode V10 will be operative and #2 stage V15 will be switched "on," when #1 stage V16 is switched "off." Thus the operation of this stage V15 is similar to that of a stage of the cycle counter under both addition and subtraction.

After a subtraction has been performed, the value registered in a denomination of the dividend counter may be up to 15 and furthermore, any carry which has been registered by the switching "on" of the carry trigger stage represents a carry of 16 and not of 10. It is necessary to correct these values to ten. Firstly, six is "added" into each denomination. This may cause the eight value trigger stage V13 to switch "on," but the resulting pulse is prevented from setting the carry trigger stage V12 since the gating valve V57 is inoperative at this time. If a carry occurred during subtraction, the stage V12 will be already "on" and this will prevent the addition of a further ten. If the carry stage is not set "on" the further ten will be added, thus returning the denomination to the original setting.

Figure 4A:
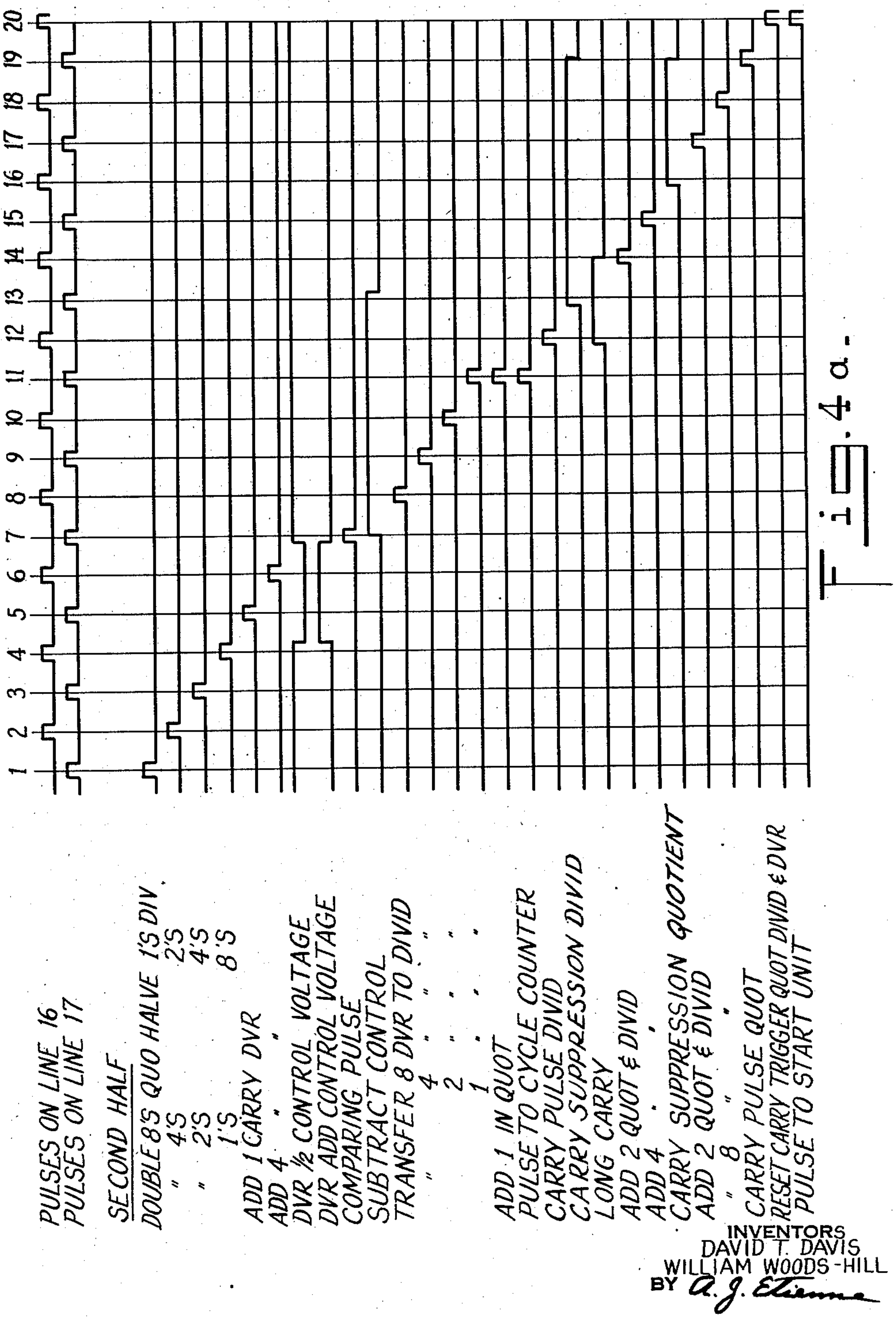

Prior to these corrections mentioned above, the counter is conditioned for subtraction by line 98 being made negative and line 97 set at the same voltage as line 44. When #8 trigger stage V13 switches "on," a negative pulse is transmitted via condenser 105 to the control grid of V3; this tube is normally conductive, with line 97 at the same voltage as line 44, as described in detail below, so that a positive pulse now appears at the anode, which pulse is inverted and transmitted by V57 and condenser 110 and condensers 51, to cause carry stage V12 to switch "on." As a result, the anode potential of the left hand half of V12 rises and the junction of resistors 112 and 113 is brought up from a negative potential to the potential of line 44. Thus, when a positive pulse (see Carry Pulse Divid. Fig. 4*a*), derived from emitter unit 7 (12) via gate 10 (12B) and amplifier 28 (Figure 1) appears on line 88, a negative pulse is produced at the anode of V11, the control grid of this pentode now being held above cut-off, and is transmitted via condenser 118 and line **100*a* to the #1 trigger in the next higher denomination. (The carry input from the next lower denomination is labeled 100** in Figure 3*a*.)

When the carry has been entered in the appropriate denominations the corrective value 6 must be "added," as stated above, in each denomination, and this is effected by "adding" 2 and then 4. A negative pulse from emitter 7 (14) via gate 10 (14B), cathode follower 63 and line 90 (Figure 1), is applied to the #2 trigger V15 (Figure 3*a*) via condensers 120 and 51 to cause it to switch over and thus "add" two to the value registered in the counter (see Add 2 Quot. & Divid., Fig. 4*a*). In a similar manner, a pulse derived from emitter unit 7 (15) is applied to #4 trigger V14 via condenser 121 and line 91 to cause the "addition" of four (see Add 4 Quot. & Divid., Fig. 4*a*).

If V12 is "off," then the junction point of the resistors 115 and 116 forming part of the potentiometer 114, 115, 116, will be positive with respect to line 44. Since this point is connected to the control grids of the pentodes V1 and V2, these pentodes will be rendered operative. Thus with trigger stage V12 "off," when a positive pulse is applied to the suppressor grid of V2 from emitter unit 7 (17), gate 10 (17B), amplifier 28, line 101 (Figure 1) and condenser 124 to "add" —2—, a negative pulse will appear at the anode of V2, and be transmitted via condenser 125 and condensers 51 to the grids of the #2 trigger V15 to effect switching and thus "add" two to the count (see Add 2 Quot. & Divid., at "17" time Fig. 4*a*). In similar manner, a positive pulse on line 93 from 10 (18B) will effect the "addition" of eight (see Add 8 Quot. & Divid., Fig. 4*a*).

The connections between #8 stage V13 and gates V3 and V4 differ from the other stages because the interposition of carry blocking tube V57 causes an additional change of polarity of the pulse. This necessitates connecting V3 to the right hand anode of #8 trigger V13 while V4 is connected to the left hand anode of V13. Furthermore, the grid resistors 127 and 128 are returned to line 44, instead of to the bias line 99, so that these values are at zero bias and therefore are operated by negative pulses only. The gate V57 prevents switching "on" of the carry trigger V12 during the period when the ten corrective value is being "added."

The line **92*a* connected to the suppressor grid of V57 is normally at the potential of line 44, thus allowing V57 to pass a pulse from V3 or V4** to switch the carry trigger "on." However, prior to the "addition" of six (see Carry Suppression, Fig. 4*a*), line **92*a* is made negative so that any pulse on the control grid of V57 is ineffective to produce a pulse at the anode. Line 92*a* is connected to a trigger 122*a*** (Figure 1*a*) similar to the carry trigger V12 (Figure 3) and line **92*a* is connected to the junction point of the resistors equivalent to 115 and 116, so that when trigger 122*a*** (Fig. 1*a*) is switched "on" by the pulse from gate 10 (13B) (Figure 1), line **92*a* is made negative and when 122*a* is switched "off" by the pulse from gate 10 (19B), line 92*a* is returned to approximately ground potential. Trigger 122** (Fig. 1*a*) is similar to trigger **122*a*** and is provided to produce Quotient Suppression from "16" time to "19" time (Fig. 4*a*).

If any of the dividend denominations is at zero and then receives a carry (all prior to correction of the counter indication), a carry-on-carry or long carry will be produced. This arises since the counter is set for subtraction and thus if all the stages are "off," one pulse will cause the stages to turn "on" in succession, as noted in connection with Table I for subtraction with the cycle counter 8. The tube V58 is provided to deal with this long carry. As shown in the timing diagram Figure 4*a*, (Long Carry) this tube V58 is operative in the period during which carry takes place. If a long carry is generated, then a positive pulse will be produced at the control grid of V57, as in the case of a normal carry. This pulse will also be applied via line 129 to the control grid of V58, producing a negative pulse at the anode which is transmitted to line **100*a* via condenser 130. Thus, valve V58 acts in effect as a by-pass to the normal carry circuit of V11 and V12 during the carry period. The suppressor grid of V58 is controlled from trigger 102 (Figure 1) via line 103. This trigger is similar to trigger V12, the line 103 being connected to the potentiometer from the left hand anode, so that when the trigger is "off," line 103 is negative with respect to ground, and at ground potential when the trigger is "on." Trigger 102 is switched "on" by a pulse from gate 10 (12B) and "off" by a pulse from emitter unit 7** (14) produced when this unit switches "on."

The divisor value is transferred to the dividend counter by a pulse on the appropriate line or lines 96 (1), 96 (2), 96 (4) and 96 (8), (Figures 1 and 3*a*), in each denomination. That is, if the value seven were to be transferred, then a single pulse would be transmitted on each of the lines 96 (1), 96 (2) and 96 (4), these pulses being in the order 8, 4, 2, 1. The carry trigger stage V12 is reset by applying a negative pulse to the right hand grid from line 94 through condenser 119. The pulse on line 94 is produced by the switching of stage 10 (20B), Fig. 1*a*, operating a cathode follower stage 63.

In order to illustrate the various steps in the subtraction of the divisor from the dividend, the subtraction of 286 from 345 is shown by way of example in Table II. In this Table II, X represents that a trigger is "on."

It will be noted that reference has been made above to "adding" six and ten. The expression "adding" is used here since the subtraction, which actually takes place, is due to the mode of operation of the counter itself and not to the form in which the entry is made.

*Table II*

| C 8 4 2 1 | C 8 4 2 1 | C 8 4 2 1 | |
|---|---|---|---|
| — — — X X | — — X — — | — — X — X | Dividend 345. |
| — — — X — | — X — — — | — — X X — | Divisor 286. |
| — — — X X | X X X — — | — — X — X | Transfer pulse 8 to dividend. |
| — — — X X | X X X — — | — — — — X | Transfer pulse 4 to dividend. |
| — — — — X | X X X — — | X X X X X | Transfer pulse 2 to dividend. |
| — — — — X | X X X — — | X X X X X | Transfer pulse 1 to dividend. |
| — — — — — | X X — X X | X X X X X | Carry in dividend. |
| — X X X — | X X — — X | X X X — X | Add 2 in dividend. |
| — X — X — | X — X — X | X X — — X | Add 4 in dividend. |
| — X — — — | X — X — X | X X — — X | Add 2 only if C is "off." |
| — — — — — | X — X — X | X X — — X | Add 8 only if C is "off." |
| — — — — — | — — X — X | — X — — X | Reset carry. |
| 0 | 5 | 9 | Value registered. |

From Table II it will be seen that during the actual subtraction process, the mode of operation is very similar to that of the cycle counter 8 with the value, however, being entered by selective direct pulsing of the individual trigger stages (or sidewise operation) instead of cascade operation as in counter 8 by entry of the appropriate number of pulses into the lowest value trigger stage.

The dividend value may be initially entered into the counter in any desired manner, as, for example, by pulsing the appropriate lines 96.

DIVISOR COUNTER

This counter is generally indicated by 2 in Figure 1, and is shown in detail in the lower part of Figure 3, and comprises the tubes V21 to V39 and V59.

The counter may be conditioned selectively either for successively doubling the value registered therein or for successively halving this value. It thus effectively combines the features of the multiplier and multiplicand counters, as described in our above cited copending application, to which reference may be had for a more detailed description of the steps involved in these two functions.

Figure 6:
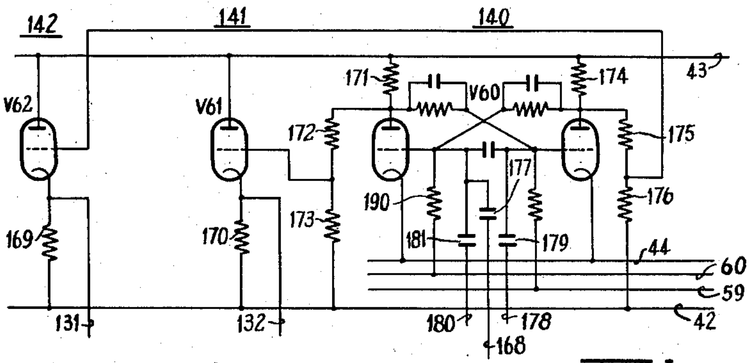
Figure 6 is a circuit diagram of the three stages 140, 141, and 142 of Figure 1.

Considering, for example, the #2 trigger stage V25 (Figure 3*a*), a connection is made via the condenser 135 to the control grids of the two gates V34 and V35 in parallel. The suppressor grid of V34 is connected through a resistor 137 to the line 131 (Figure 1 and Figure 6). When the trigger V60 (Fig. 6) of element 140 (Fig. 1) is "off," the line 131 (Figures 6, 3*a* and Figure 3) is at approximately ground potential, and accordingly V34 (Fig. 3*a*) and the similarly connected pentodes V28, V29, V30, V32 (Fig. 3) and V36 (Fig.3*a*) will be operative. When #2 trigger V25 switches "off" a positive pulse will be transmitted to the control grid of pentode V34 via condenser 135, and will appear as a negative pulse at the anode of V34, which, via the condensers 138 and 51, will be applied to the grids of #4 trigger V24 to switch it over. Thus the above mentioned gates, when V60 of Fig. 6 is off, allow each trigger when it switches from "on" to "off" to switch the next higher trigger, to thus produce doubling.

When the trigger V60 is "on," the line 132 (Figs. 6, 3*a* and 3) will be at approximately ground potential and the gates V31, V33, V35, V37, V38 and V39 will be operative. In this case, when trigger V25 switches "off," a pulse will be transmitted via the pentode V35 and the condensers 139 and 51, to switch over the #1 trigger V26, that is, when each of the triggers switches "off," it now switches over the next lower trigger stage, to thus produce halving.

As already noted, during the first part of the division operation, the value in the divisor counter is doubled, so that pentodes V28, V29, V30, V32, V34 and V36 will be operative. The lines 65, 66, 67 and 68 are connected via condensers to the right hand grids of the triggers V23, V24, V25 and V26, so that a negative pulse on these lines will cause the related trigger to switch "off," if it is in the "on" condition that is with the right hand valve conducting. At the very beginning of a short emitter cycle, a negative pulse from gate (1A) is transmitted via the cathode follower stage 63 and line 65 to all the #8 triggers of the divisor. If any of these triggers are "on," then they will be switched "off" and the pulse produced at the left hand anode will, via the related gates V30 (Fig. 3) and pentodes V59, switch "on" the carry up trigger V22 in much the same way as the valves V4 and V57 in the dividend counter. A negative pulse from 10 (2A) is then similarly transmitted via line 66 to all the #4 triggers. Any one of these which is "on" will be switched "off" and through the gates V32 will switch "on" the #8 trigger V23. Succeeding pulses on the lines 67 via 10 (3A) and 68 via 10 (4A) will cause the switching of the #2 and #1 triggers. In this manner, the value registered in the counter is doubled, the value of the carrying trigger stage being regarded as 16. In order to correct the value in each denomination to the scale of 10, it is now necessary to add 6 and 10. Pulses on the lines 69 and 70 add 2 and 4, respectively (see Add 2 in DVR and Add 4 in DVR, Fig. 4). Further, the pentodes V28 and V29 correspond to the pentodes V1 and V2 of the dividend counter and if carry trigger CU is not "on" control the addition of 10, while the pentode V59 corresponds to the pentode V57 and when conditioned by a negative pulse on line 71 via 10 (7A) and unit 76 (until 11A flips 76 back) prevents the setting of the carry trigger stage during this addition of 10 (see Carry Suppression in DVR, Fig. 4). Since the value, after doubling, must be even, the addition of a 1 carry cannot cause a further carry, so that no equivalent to V58 is required. The entry of the carry and the resetting of the carry stage are similar to these functions in the dividend counter but occur at different times (see Carry Pulse DVR and Reset Carry Triggers DVR, Fig. 4).

As stated above, when the trigger V60 (Fig. 6) is "on," the counter is conditioned for halving, that is to say, the gates V31, V33, V35 and V37 are operative and also pentodes V38 and V39. In order to effect halving, the lines 65 to 68 are again individually pulsed, but this time in the reverse order, that is, the #1 trigger is pulsed first and the #8 trigger last, as described in detail later. If #1 trigger V26 is "on" when it is pulsed, then it will be switched "off," and through gate V37, a pulse will be applied to the carry down trigger V27, which will thereby be switched "on." If the #2 trigger V25 is "on," then, in being switched "off" it will switch "on" the #1 trigger V26 and similarly for the remaining triggers. Thus, the value registered in the counter is halved, the carry down trigger V27 being considered as representing the value .5.

In order to make a carry down, it is necessary to enter 5 in the next lower denomination. This requires that the lower counter be conditioned for adding in the normal way, that is, each trigger stage must set the next higher one (see DVR ½ Control Voltage and DVR Add Control Voltage, Fig. 4*a*). Since the initial value has been halved, there cannot be more than 4 registered in any denomination, which, together with the added carry of 5, cannot produce a further carry. The conditioning of the counter for adding this carry down is effected by the trigger stage V60 being switched "off" again, as explained in detail later. A positive pulse derived from gate 10 (5B), amplifier 28 and line 80 (Fig. 1) (see Add 1 Carry Div., Fig. 4*a*) is applied to the suppressor grid of pentode V39 (Figure 3*a*). If the CD trigger stage V27 is "on," then the control grids of V38, and V39 will be approximately at earth potential, so that the positive pulse on the suppressor grid of V39 will produce a negative pulse at the anode, which, via condenser 144 and line 133, is applied to the #1 trigger in the next lower denomination to switch it over, as is also indicated by the line 133*a*. A succeeding pulse on line 81 from 10 (6B), Fig. 1 (see Add 4 Carry DVR, Fig. 4*a*) is similarly transmitted via condenser 143 and line 134 to the #4 trigger in the next lower denomination, so that after these two pulses the 5 carry down has been correctly entered.

Each of the triggers V23, V24, V25, V26 is provided with a potentiometer comprising (see V26 Fig. 3*a*) the left hand anode resistor 144 and resistors 145 and 146. When the trigger stage is "off," the junction point of resistors 145 and 146 will be negative, and when the trigger stage is "on," the junction point will be at ground. To each of these potentiometers, the lines 95 (8) (for V23), 95 (4), 95 (2) and 95 (1) (for V26) are respectively connected. These lines go to the control grids of the transfer pentodes labeled 6 (Figure 1) and shown as V65 in Fig. 5. Thus, when a particular trigger is "on" it renders the related transfer pentode operative, so that when a positive pulse is applied to the suppressor grid of the transfer pentode, a negative pulse will appear at the anode on one of the lines 96 and thus effect entry of the value into the dividend counter as already explained.

The divisor value may be initially entered by applying pulses to the control grids of V26, V25, V24 and V23 via the required combination of the lines 158 (1), 158 (2), (Fig. 3*a*) 158 (4) and 158 (8), (Fig. 3) in each denomination.

COMPARING CIRCUIT

Since it is required that the divisor be subtracted from the dividend, only when a positive remainder will result, it is necessary to compare the values of the divisor and dividend to determine whether subtraction should take place. This comparison is effected by a group of pentodes V17, V18, V19 (Fig. 3) and V20, in each denomination (Figure 3*a*). This circuit actually indicates if the divisor is greater than the dividend, so that the control circuits are arranged in such a way that subtraction normally takes place and is only prevented from taking place when the appropriate indication is obtained from the comparing circuit. Each of the pentodes in the comparing circuit operates in the same way so that only one will be described in detail.

The suppressor grid of pentode V17 (Fig. 3) is connected through a resistor 147 to the right hand anode of the #8 trigger V13 in the dividend counter, and through an equal resistor 148 to the left hand anode of the #8 trigger V23 in the divisor counter. The suppressor grid is also connected through a further resistor 149 to the control grid, which is connected through a resistor 150 to the negative supply line 151. Since the resistors 147 and 148 are connected to opposite anodes of the trigger stages of the dividend and divisor counters, then the suppressor grid may assume one of three potentials, depending upon whether the related triggers are "on" or "off."

(1) If #8 trigger V13 of DD is "on" and #8 trigger V23 of DR is "off," then the right hand tube of V13 and the left hand tube of V23 will be conducting, so that the suppressor grid will assume a minimum potential.

(2) If both triggers are "on" or both "off," then the suppressor grid will assume an intermediate potential, since either resistor 147 or 148 will be connected to a higher potential anode and the other to a lower potential anode.

(3) If DR greater than DD, #8 trigger V23 of DR is "on" and #8 trigger V13 of DD is "off" and the suppressor grid of V17 will assume its maximum potential, since both resistors 147 and 148 will be connected to anodes which are at the higher potential.

The potentials of lines 151, 154 and 153 are so adjusted relative to line 44 that in condition (1) both the control grid and the suppressor grid of V17 are below cut-off potential. In condition (2) the control grid is above cut-off but the suppressor grid is below cut-off potential, and accordingly a pulse will be produced at the screen grid, but not at the anode. In condition (3) both control grid and suppressor grid are above cut-off potential, so that a negative pulse will appear at both the anode and the screen grid.

The anodes of all the comparing pentodes are commoned and connected to the supply line 153 through a resistor 155. Thus, if a particular trigger stage in the divisor counter is "on," without the corresponding stage in the dividend counter being "on," then a negative pulse will be produced in the common anode circuit and be transmitted via condenser 156 and line 157 to the subtracting control trigger 87 (Fig. 1) which is normally set to permit subtraction but will now prevent such subtraction since DR is greater than DD.

If the value represented by the dividend and divisor triggers #8 for example is the same, the suppressor has an intermediate potential and a pulse is produced at the screen grid. Since the pulse applied via line 82 to the control grid is positive as described presently, this screen grid pulse will be negative. However, the time constant of the condenser 159 and resistor 150 is sufficiently small for partial differentiation of the pulse to occur, thus producing at the control grid of the next lower pentode in the chain a negative pulse coincident with the leading edge of the screen grid pulse and a positive pulse coincident with the trailing edge. This latter pulse will then act as the input pulse for this lower pentode. Thus, if a number of trigger stages in the divisor and dividend counters are in the same states, a pulse will travel down the chain of comparing pentodes, the pulse to operate each pentode being derived from the screen grid of the next higher in the chain. The positive pulse to the control grid of the first comparing pentode V17 is applied via line 82 and amplifier 28 (Figure 1).

If the divisor is lower in value than the dividend at any particular point along the chain of comparing pentodes, then both grids of the related comparing pentode will be below cut-off and a pulse will not be passed on to the next lower stage. This is immaterial since the values represented below this point cannot alter the result.

The subtraction control trigger stage 87 (Figure 1*a*) is similar to those already described in which the right hand anode resistor forms part of a potentiometer and the line 160 is connected to the junction of the two lower resistors of the potentiometer. At the start of the dividing operation this trigger stage is "on" so that line 160 is at a negative potential and the suppressor grids of gates 10 (8B), 10 (9B), 10 (10B) and 10 (11B) are held below cut-off, being connected to this line 160 instead of line 12. The pulse which switches switch control unit 13 "on" is also transmitted by a cathode follower 63 and line 162 to stage 87 to switch it "off" and thus bring the line 160 to ground potential.

A pulse on line 157, indicating that the divisor is larger than the dividend, causes this trigger stage 87 to switch "on," thus disabling the gates connected to line 160 before they can initiate subtraction. Emitter unit 7 (13) via gate 10 (13B) supplies a pulse to reset stage 87 to the "off" state if it has been switched "on" by a pulse on line 157.

TRANSFER TUBES

Figure 5:
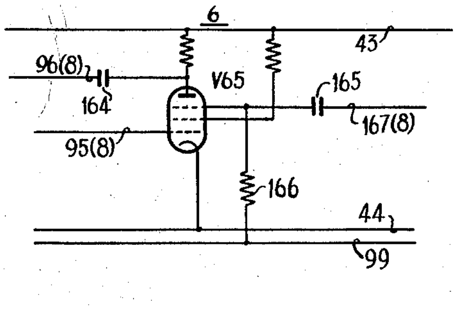
Figure 5 is a circuit diagram showing one of the transfer tube circuits 6 of Figure 1.

These transfer tubes are pentodes, labeled 6 in Figure 1*a* and a detail pentode circuit is shown in Figure 5.

One of these transfer pentodes (24 in all) is provided for each and every trigger of all orders of the divisor counter. The control grid of each pentode for example V65 (Fig. 5) is connected to the related divisor trigger circuit by a line 95 (Figures 1*a*, 1 and 5), or 95 (8), 95 (4) (Fig. 3), 95 (2) and 95 (1) (Fig. 3*a*) and the anode is connected to the related dividend trigger by a condenser 164 and line 96 such as 96 (8) of Fig. 5. The suppressor grid of each transfer pentode is connected to the bias line 99 (Figure 5) through resistor 166, and for those pentodes which are connected to #8 trigger stages, a connection through condenser 165 to line 167 (8) permits transfer when plus is applied to this line. Line 167 (8) is connected to line 83 via amplifier 28 and a cable (Figs. 1*a* and 1) as described presently. Similarly line 84 is connected to the suppressor grids of the transfer pentodes relating to the #4 trigger stages, line 85 to the #2 transfer pentodes and line 86 to the #1 transfer pentodes. For clarity of illustration, these four lines 83–86 are shown cabled as 163 with a single amplifier 28 (Figures 1*a* and 1). The negative pulse from gate 10 (8B) will appear as a positive pulse at the anode of amplifier 28 and will be transmitted to the suppressor grids of all the #8 transfer pentodes by lines 167 (8) and condensers 165. If the control grids of any of these pentodes are above cut-off, due to the divisor #8 triggers being "on," then a negative pulse will be produced at the anode which, via condenser 164 and line 96 (8) will be transmitted to the #8 trigger stage in the dividend counter, as already described. Since the gates 10 (8B), 10 (9B), 10 (10B), and 10 (11B) are controlled by the subtraction control trigger stage 87, transfer will take place only if this stage is "off" with line 160 at ground E, as stated above. Since the dividend counter is conditioned for subtraction, then the transfer will result in the divisor value being subtracted from the dividend value.

QUOTIENT COUNTER

This counter is indicated generally as 5 in Figure 1, and is not shown in detail since it is identical with the decimal denominations of the multiplicand counter, shown in our above cited copending application. This counter is impulsed once each cycle, in which subtraction occurs, to add a one therein and as described later the value registered therein is doubled whether such subtraction occurs or not.

The entry of unit increments of the quotient value is made in the following manner:

Whenever the gate 10 (11B) operates, that is to say, whenever a subtraction of the divisor from the dividend does take place, a negative pulse is transmitted via line 9 to the lowest value trigger stage in the units order of the quotient counter 5. Thus the final quotient value is built up by entering 1 every time subtraction takes place, and further by doubling the value registered in the quotient counter for each complete emitter cycle taking place during the second half of the operation as described later.

AUXILIARY CONTROL CIRCUITS

In Figure 6 a detail circuit diagram is shown of the trigger stage 140 indicated as V60 in Figure 6 and the cathode follower stages 141 and 142 indicated as V61 and V62, respectively, in Figure 6 which control whether the divisor counter is conditioned for halving or doubling.

The left hand grid of the trigger stage V60 is connected through the resistor 190 to the reset bias line 60, so that this trigger stage is initially set in the "off" state. The junction point of the resistors 172 and 173 forming part of the potentiometer 171, 172 and 173 will therefore be at a lower potential than the junction point of the resistors 175 and 176, which form part of the potentiometer 174, 175, 176. Thus the grid of the cathode follower stage V61 will be lower in potential than the grid of the cathode follower stage V62 so that there will be a smaller anode current through V61 than through V62 with a correspondingly smaller voltage drop across the cathode resistor 170 than across the cathode resistor 169. The line 132 will then be negative with respect to line 131 so that the gates V30, V32 (Fig. 3), V34 and V36 (Figure 3*a*) will be operative and the gates V31, V33, V35 and V37 will be inoperative, that is to say, the divisor counter initially will be conditioned for doubling.

The negative pulse which switches on switch control unit 13 (Figure 1) will also be transmitted by line 168 and condenser 177 (Figure 6) to the left hand grid of V60, to switch it "on." The relative potentials of the grids of the cathode followers V61 and V62 will be reversed and consequently the relative potentials of the lines 131 and 132 will also be reversed and the divisor counter will now be conditioned for halving.

A connection is made from the right hand anode of emitter unit 7 (5), via the line 178 and condenser 179 (Fig. 6) to the right hand grid of trigger stage V60 of control stage 140 (Fig. 1) thus switching the trigger stage "off." Thus the divisor counter is conditioned at this time for doubling, i. e. adding, in which condition it can accept any carry down "5" carries, which may be produced under control of the "on" carry down trigger stages, which also start at this time. After this carry entry has been completed, a further negative pulse from gate 10 (7B) via lines 82 and 180 and condenser 181, is applied to the left hand grid of trigger stage V60 to switch it "on" again (see DVR ½ Control Voltage Div Add Control Voltage, Fig. 4*a*), thus conditioning the divisor counter for halving, which will take place however only at the beginning of the next emitter cycle.

Figure 7:
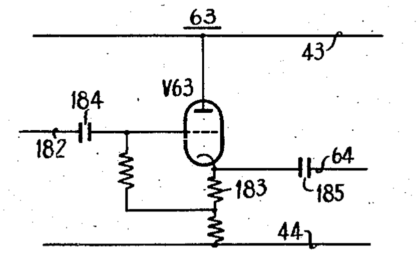
Figure 7 is a circuit diagram of any one of the cathode follower stages each generally indicated as 63 in Figure 1

In Figure 7 is shown a circuit diagram of a cathode follower stage, each designated 63 in Figure 1. These stages are used purely for isolating purposes, since they provide a low impedance output of the same polarity as the input when it is required to feed a number of stages from a common line. The stage shown in Figure 7 corresponds specifically to that shown in line 182 at the right hand side of Figure 1 which controls entry of the carry in the quotient counter. A negative pulse is applied to the grid of V63 from gate 10 (19B) via this line 182 and condenser 184. A negative pulse of slightly less amplitude will appear across the cathode load resistor 183 and be transmitted by condenser 185 and line 64, to all the carry tubes in the quotient counter. The low impedance output provided by the cathode follower stage greatly assists in preventing inter-action between the various stages which may be connected to the common line. It may be noted that cathode follower stages are actually used interposed in the following lines (Figure 1)—69, 70, 75, and 89. These are omitted from the drawing in the interests of clarity.

Figure 8:
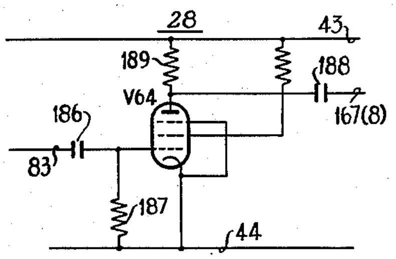
Figure 8 is a circuit diagram of any one of the amplifier stages generally indicated at 28 in Figure 1.

The amplifiers designated 28 in Figure 1 are employed when it is necessary to convert the normal negative pulse output of the gates 10 to a positive pulse. The circuit diagram of a typical stage 28, for example that connected in line 83 between the gate 10 (8B) and the #8 transfer pentodes 6, is shown in Figure 8. The control grid of the pentode V64 (Figure 8) is connected to the ground potential line 44 so that when a negative pulse is applied to the grid via this line 83 and condenser 186, the pentode is cut off and a positive pulse appears across the anode load 189. This pulse is transmitted via condenser 188 and line 167 (8) to the #8 transfer pentodes 6 (Figure 1*a*). Amplifiers 28, not shown in Figure 1, are also interposed in the lines 72, 73, and 74.

OPERATION DURING DIVISION

The operation of the various counters in the dividing device having been explained individually, the functions which occur within the complete emitter cycles in both the first and second halves of a complete division operation will now be considered. In this connection, reference to Figures 4 and 4*a* will show the relative timing of the various functions. The functions will be set out as a series of steps, the numbering of the steps corresponding to the number of the emitter unit which controls the function.

In the First Half of the Dividing Operation, the Value Registered in the Divisor Counter Is Doubled Once for Each Short Emitter Cycle

*Step 1*

A pulse is applied (see Doubling DVR 8's, Fig. 4) to all the #8 trigger stages in the divsor counter via line 65; thus switching off any which are "on" and thus switching "on" the corresponding carry up trigger stages. The trigger V60 of control trigger stage 140 (Figs. 1 and 6) is at this time in "off" status to condition line 131 relatively plus and thus condition the divisor counter for doubling.

*Step 2*

The #4 trigger stages (see Doubling DVR 4's, Fig. 4) of the divisor counter are pulsed via line 66 to effect doubling of 4 into 8.

*Step 3*

The #2 trigger stages (see Doubling DVR 2's, Fig. 4) are similarly pulsed via line 67.

*Step 4*

The #1 trigger stages (see Doubling DVR 1's, Fig. 4) are similarly pulsed via line 68.

*Step 5*

A pulse on line 69 causes 2 to be added (see Add 2 in DVR, Fig. 4) as part of the corrective 6 into each denomination of the divisor counter (Figure 1 and Figure 3*a*).

*Step 6*

A pulse on line 70 causes 4 to be added (see Add 4 in DVR, Fig. 4) in each denomination of the divisor counter, thus completing the entry of 6 which forms part of the cycle for correcting the value registered in the scale of 16 to a scale of 10.

*Step 7*

A negative pulse from gate 10 (7A) switches trigger stage 76 "on," which, via line 71 (Figs. 1 and 3) cuts off the carry pentodes V59 (see Carry Suppression in DVR, Fig. 4) in the divisor counter (Figures 1 and 3).

*Steps 8 and 9*

A pulse on line 72 (see Add 2 in DVR at "8" time, Fig. 4) and a pulse on line 73 (see Add 8 in DVR, Fig. 4) add 2 and 8, respectively, in each denomination of the divisor counter in which the carry trigger stage is not set. Thus a total of 16 will have been added in such denominations and they will have been returned to the registration which existed, prior to the addition of —6— (2 and 4, respectively) in steps 5 and 6.

*Step 10*

A pulse on line 74 is transmitted to all the carry pentodes V21 in the divisor counter (see Carry Pulse DVR, Fig. 4) so that for any denomination in which the carry trigger stage is set a carry of 1 will be made into the next higher denomination.

*Step 11*

A pulse on line 75 causes the resetting (see Reset Carry Triggers DVR, Fig. 4) of all the carry trigger stages to their "off" state. A pulse from emitter unit 7 (11) via line 30, the amplifier stage 28 and line 35 causes the additive entry of 1 (see Pulse to Cycle Counter, Fig. 4) in the cycle counter 8 (Figure 1 and Figure 2).

*Step 12*

A pulse from gate 10 (12A) via the gate 24 and line 20 (see Pulse to Start Unit, Fig. 4) transmits a pulse to the start unit 15 to switch emitter stage 7 (1) "on" and commence a new short emitter cycle.

Further cycles of doubling of the divisor value will occur until the divisor value exceeds six denominations, when the switching "on" of trigger stage 3 (Figure 1) will cause the switching "on" of switch control unit 13 as already explained. At the same time, the cycle counter 8 will be conditioned for subtracting instead of adding by the unit 31 (V45 of Fig. 2) and trigger stage 54 also will be switched "on." The stage 140 (Figure 1 and Figure 6) will also be switched "on" to condition the divisor counter for halving. By the switching "on" of the switch control unit 13, the gates 10A are rendered inoperative and the gates 10B operative, so that the second half of the operation will now start.

*Step 1 (second half)*

A pulse from gate 10 (1B) via cathode follower stage 63 and line 68 is applied to all the #1 trigger stages in the divisor counter to cause halving of this value (see Double 8's Quo. Halve 1's Div., Fig. 4*a*) and consequent operation of the carry down trigger stage V27 (Figure 1 and Figure 3*a*). The same pulse, through another cathode follower stage 63 and line 76, is applied to all the #8 trigger stages in the quotient counter to cause doubling of this value with consequent operation of the carry trigger stage.

*Step 2*

A pulse from gate 10 (2B) via the cathode follower stage 63 and line 67 causes halving of the #2 trigger stages (see Double 4's Quo. Halve 2's Div., Fig. 4*a*) in the divisor counter and the same pulse via another cathode follower stage 63 and line 77 causes doubling of the #4 trigger stages in the quotient counter.

*Step 3*

Similarly, the pulses on lines 66 and 78 cause halving of the #4 trigger stages in the divisor counter and doubling of the #2 trigger stages in the quotient counter (see Double 2's Quo. Halve 4's Div., Fig. 4*a*).

*Step 4*

Pulses on lines 65 and 79 cause halving of the #8 trigger stages in the divisor counter and doubling of the #1 trigger stages in the quotient counter (see Double 1's Quo. Halve 8's Div., Fig. 4*a*).

*Step 5*

A pulse from the gate 10 (5B) via the amplifier 28 and line 80 is applied to the tubes V39 in the divisor counter so that if the carry down trigger stage V27 is set, then 1 (out of 5) is added (see Add 1 Carry DVR, Fig. 4*a*) into the next lower denomination (Figure 1 and Figure 3*a*). Also, a negative pulse from emitter unit 7 (5), when it switches "on" is applied via line 178 and condenser 179 to the right hand grid of the trigger stage V60 of doubling and halving control stage 140 (Figure 1 and Figure 6) to switch it "off," thus conditioning the divisor counter to add any 5 carries (see DVR ½ Control Voltage, Fig. 4*a*) which may be entered.

*Step 6*

Similarly, a pulse from 10 (6B) applied via amplifier 28 and line 81 to the tubes V38 (Figure 3) in the divisor counter will cause the addition of 4 (see Add 4 Carry DVR, Fig. 4*a*) in the next lower denomination, thus completing the carry down of 5.

*Step 7*

A pulse on line 82 from 10 (7B) is transmitted to the first pentode of the chain of comparing pentodes (see Comparing Pulse, Fig. 4*a*). If the divisor value is higher than the dividend value, then a pulse will be produced on line 157 which will switch trigger stage 87 (Fig. 1*a*) "on," and thus prevent subtraction taking place on this cycle (see Subtract Control, Fig. 4*a*). A pulse is also transmitted via line 82 and line 180 to stage 140 to switch it "on" and thus condition the divisor counter for halving once again (see DVR ½ Control Voltage, Fig. 4*a*).

ASSUMING WE REACH A CONDITION IN WHICH DR IS NOT GREATER THAN DD IN WHICH CONDITION 87 IS "OFF" TO PERMIT SUBTRACTION

*Step 8*

A pulse on line 83 via cable 163 and amplifier 28 and line 167 (8) will be transmitted to the suppressor grids of all the #8 transfer pentodes 6 (Figure 1*a*) to cause transfer of this value to the dividend counter in any denominations in which the #8 divisor trigger stages are set "on" (see Transfer 8 DVR to Divid., Fig. 4*a*).

*Steps 9, 10 and 11*

Similarly, pulses in succession on lines 84, 85 and 86 will cause transfer of the divisor values 4, 2, 1 in each denomination (see Fig. 4*a*) into the corresponding denominations of the dividend counter. Since this counter is conditioned for subtraction, the divisor value will be subtracted from the dividend value to leave a positive remainder. A pulse from gate 10 (11B) will also be transmitted via line 9 to the lowest value trigger stage of the units order of the quotient counter (see Add 1 in Quot., Fig. 4*a*) to enter 1 therein. As in the first half of the operation, a pulse will also be transmitted from emitter unit 7 (11) to the cycle counter (see Pulse to Cycle Counter, Fig. 4*a*) which has been set for subtraction by stage 31.

*Step 12*

A pulse on line 192 will via amplifier 28 and line 88 be applied to all the carry tubes in the dividend counter (see Carry Pulse Divid., Fig. 4*a*) and also will switch trigger stage 102 "on." This stage via line 103 makes operative the tubes V58 in the dividend counter (see Long Carry, Fig. 4*a*) to deal with a "Long Carry" should this occur (Figure 1 and Figure 3).

*Step 13*

A pulse from gate 10 (13B) is transmitted to trigger stage **122*a*** to initiate carry suppression (see Carry Suppression Divide, Fig. 4*a*) and also trigger stage 87 was switched "on" by a pulse from the transfer unit when DR is greater than DD to switch this stage "off" (see Subtract Control, Fig. 4*a*) and thus prepare the subtraction control circuit for a subtraction operation on the next cycle.

*Step 14*

A pulse via CF 63 on line 90 causes a corrective —2— to be entered in all denominations of both the quotient and dividend counters (see Fig. 4*a*) and a negative pulse from emitter unit 7 (14) when switching "on" switches "off" trigger stage 102, thus rendering the long carry circuit (see Long Carry, Fig. 4*a*) once more inoperative.

*Step 15*

A pulse via CF 63 on line 91 causes the entry of a corrective —4— in all denominations of the quotient and dividend counters (see Fig. 4*a*), thus a total correction of 6 is added at Steps 14 and 15.

*Step 16*

The pulse from gate 10 (16B) switches "on" the trigger stage 122, which, via line 92, renders inoperative the tubes in the quotient counter corresponding to the tubes V57 in the dividend counter, so that during the subsequent addition of 10, the carry trigger stage will not be set up (see Carry Suppression Quotient, Fig. 4*a*).

*Steps 17 and 18*

During these two steps, a total of 10 is added (see Fig. 4*a*) into all denominations of both the quotient and dividend counters, 2 being added by a pulse on line 101 and 8 by a pulse on line 93. This "addition" takes place in those denominations in which the carry trigger stage has not been set.

*Step 19*

A pulse on line 182 via cathode follower stage 63 and line 64 effects the entry of a carry (see Carry Pulse Quot., Fig. 4*a*) in the stage next higher to that in which the carry trigger stage has been set in the quotient counter. The pulse on line 182 also switches "off" the trigger stage 122 (see Carry Suppression, Fig. 4*a*) which prevents while it is "on," the switching "on" of the carry trigger stage via tubes V57 in the dividend counter and corresponding tubes in the quotient counter.

*Step 20*

The pulse from the gate 10 (20B) via the cathode follower stage 63 and line 94 causes resetting (see Fig. 4*a*) of the carry trigger stages in the divisor, dividend and quotient counters. The same pulse via line 27, amplifier 28, and gate 24 and line 20, is transmitted to the start unit 15 (see Pulse to Start Unit, Fig. 4*a*) to thus switch "on" emitter stage 7 (1) and start a new long cycle of emitter operation. The trigger stage 54 is also switched "off" by the pulse on line 27 and in switching "off" transmits a pulse via line 57 to the cycle counter 8 to enter a further 1. This only occurs on the first cycle of the second half of the operation, since trigger stage 54 is only switched "on" when switch unit 13 is switched "on."

Similar emitter cycles then occur successively until the number of cycles in the second half of the operation equals that in the first half. A pulse from the cycle counter 8 (Figure 1*a*) is then sent via line 21 (Figs. 1*a* and 1) to the start unit 15 to switch it "off" to prevent further emitter cycles and thus terminate division.

In order to further clarify the method of operation of the machine, a numerical example is shown, together with the values which are registered on the various counters during each of the emitter cycles. The example considered is that of dividing 121 by 71.

FIRST HALF

| Number of Emitter Cycles | Divisor | |
|---|---|---|
| | 71 | |
| 1 | 142 | 1 |
| 2 | 284 | 2 |
| 3 | 568 | 3 |
| 4 | 1136 | 4 |
| 5 | 2272 | 5 |
| 6 | 4544 | 6 |
| 7 | 9088 | 7 |
| 8 | 18176 | 8 |
| 9 | 36352 | 9 |
| 10 | 72704 | 10 |
| 11 | 145408 | 11 |
| 12 | 290816 | 12 |
| 13 | 581632 | 13 |
| 14 | [1] *1*163264 | 14 |

[1] Italic represents overflow indications.

SECOND HALF

| Divisor | Dividend | Quotient | Emitter Cycle |
|---|---|---|---|
| 1163264 | 121000 | 0 | 1 |
| 581632 | | | |
| 290816 | 121000 | 0 | 2 |
| 145408 | 121000 | 0 | 3 |
| 72704 | 121000 | 1 | 4 |
| | 72704 | | |
| | 48296 | | |
| 36352 | 48296 | 2 | 5 |
| | 36352 | 3 | |
| | 11944 | | |
| 18176 | 11944 | 6 | 6 |
| 9088 | 11944 | 12 | 7 |
| | 9088 | 13 | |
| | 2856 | | |
| 4544 | 2856 | 26 | 8 |
| 2272 | 2856 | 52 | 9 |
| | 2272 | 53 | |
| | 584 | | |
| 1136 | 584 | 106 | 10 |
| 568 | 584 | 212 | 11 |
| | 568 | 213 | |
| | 16 | | |
| 284 | 16 | 426 | 12 |
| 142 | 16 | 852 | 13 |
| 71 | 16 | 1704 | 14 |

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic divider comprising an electronic counter for storing a divisor factor, an electronic counter for storing a dividend factor, an electronic counter for developing a quotient value, means for halving said divisor, means for comparing said halved divisor with said dividend, means controlled by said comparing means for selectively subtracting said halved divisor from said dividend only when said divisor halved value does not exceed said dividend and entering an increment of value in said quotient counter and means doubling the value of said incrementally developed quotient value.

2. An electronic divider comprising an electronic counter for storing a divisor factor, an electronic counter for storing a dividend factor, an electronic counter for developing a quotient value, means for controlling the doubling of said divisor value until it overflows the storage capacity of said divisor counter, means operative upon said overflow to reverse said doubling to halving, means electronically comparing a halved value with said stored dividend value and effective when said divisor value does not exceed said dividend value to subtract said halved divisor from said dividend, means for entering an increment of value in said storage counter, and means invariably doubling the value accumulated in said quotient counter.

3. An electronic computer comprising an electronic divisor counter, an electronic dividend counter and an electronic quotient counter, a cyclic electronic pulse emitter, means controlled by said emitter for repeatedly doubling an entered divisor value until the doubled value exceeds the greatest dividend value which can be stored, means controlled by said emitter for thereafter repeatedly halving said previously doubled divisor values, means comparing the divisor value standing in said divisor counter and the dividend value, transfer means controlled by said comparing means and effective to transfer said divisor value subtractively to said dividend only if said divisor value does not exceed said dividend value, and means for building in said quotient counter a plurality of terms of a binary series, the sum of which comprises the quotient of said dividend value divided by said divisior value.

4. A device as in claim 3 and including an overflow device operated when said doubled divisor value exceeds the capacity of said divisor counter, and means rendered operative by said overflow means to change said doubling process to said halving process.

5. A device as in claim 3 and including an overflow device operated when said repeatedly doubled divisor value exceeds the greatest dividend value which can be stored, and means rendered operative upon operation of said overflow device to alter the destination and number of pulses produced by said pulse emitter in one cycle.

6. A device as in claim 3 and including an electronic counter, means adding a unit increment of value into said counter for each of said doubling operations, and means automatically setting said counter to subtraction whenever said overflow device is operated.

7. A device as in claim 3 and including an electronic counter, means additively feeding a pulse to said counter for each doubling operation performed, means subtractively feeding a pulse to said counter for each halving operation performed, and means controlled by said counter for stopping said device when said counter reaches zero.

8. A device as in claim 3 and including an overflow device operated when said doubled divisor value exceeds the capacity of said counter, a counter for additively counting the number of said doubling operations, and means controlled by said overflow device for setting said counter to subtract whereby the number representing the cycles of halving operations is subtracted from the number additively registered in said counter.

9. A device as in claim 3 and including means for transferring to said quotient counter a unit increment of value each time said divisor value is transferred to the dividend counter, and means for doubling the value accumulated in said quotient counter each time said divisor value is halved.

10. A computer comprising an electronic trigger counter settable to represent a dividend, an electronic trigger counter settable to represent a divisor, electronic comparing circuits operable simultaneously and jointly by the triggers of said dividend and divisor counters and settable in accordance with the equality or two types of disparity of dividend and divisor values, means rendering said comparing means inoperative upon an equality setting, and means selectively rendering said comparing means operative in accordance with one type of disparity of value and inoperative if the other type of disparity controls.

11. A computer comprising an electronic counter settable to represent a dividend value, an electronic counter settable to represent a divisor value, an electronic comparing circuit operable simultaneously and jointly by the triggers of said dividend and divisor counters selectively settable in accordance with equality of dividend and divisor values, preponderance of dividend over divisor value or subservience of dividend to divisor value, and means controlled by said comparing circuit for transferring said divisor to said dividend counter, said means being rendered inoperative only on subservience of dividend to divisor value.

12. A device as in claim 11, said comparing circuit comprising a pentode for each value trigger of said dividend counter and its associated divisor counter, means connecting a grid of each pentode to its associated value dividend trigger and to an associated value divisor trigger, means connecting said pentodes in a chain, and means applying an operating pulse to the highest value pentode whereby a pulse passes through said pentode chain until it reaches a pentode whose grid is conditioned by a divisor trigger which is on and a dividend trigger which is off, said last pentode producing an output pulse to prevent transfer of said divisor value to said dividend counter.

13. An electronic counter comprising a series of electronic triggers selectively representing a series of binary values, means for selectively setting said triggers to represent a divisor value, a second electronic counter similar to said first and selectively operable to represent a dividend value, a comparing circuit comprising a series of electronic tubes one for each trigger of said divisor counter, means coupling similar binary valued triggers of said divisor and dividend trigger series respectively to said tubes whereby the on and off conditions of said associated triggers selectively prime the associated tube in three different degrees depending upon similarity of on and off settings of said associated triggers or the two combinations of dissimilar on and off conditions of said associated triggers, means connecting said tubes in a chain, means applying an operating pulse to the first tube of said chain, said pulse passing successively through said tubes as long as similarity of respective trigger settings prevails and effective to produce an output pulse whenever the priming of any higher tube in the series is indicative of a divisor trigger being on and a corresponding dividend trigger being off.

14. A computer comprising an electronic counter settable to represent a dividend value, an electronic counter settable to represent a divisor value, an electronic comparing circuit operable simultaneously and jointly by said dividend and divisor counters for comparing said values, a transfer circuit controlled by said comparing circuit and normally operative to transfer said divisor value subtractively to said dividend counter and rendered inoperative only when said comparing circuit ascertains that the divisor value is greater than the dividend value, a quotient counter and means for entering a unit increment of value into said quotient counter each time said divisor value is transferred.

15. A computer comprising an electronic emitter, an electronic subtracting counter settable initially to store a dividend value, an electronic counter for storing a divisor value, electronic comparing means for comparing said dividend and divisor values, a transfer circuit controlled by said comparing means for normally transferring said divisor value to said dividend counter for subtraction therein, means rendering said transfer means inoperative only when said divisor value is greater than said dividend value, means for halving said divisor value and again comparing said dividend and divisor values, a quotient counter, means effective to transmit a unit increment of value to said quotient counter each time said divisor is transferred, and means accumulating the value of said quotient increments and doubling the accumulated quotient value each time said divisor value is halved.

16. An electronic register comprising a series of binary trigger elements connected in cascade, means for selectively directly operating each of said triggers independently of its associated cascaded triggers from on to off or vice versa, a control tube for each tube of each trigger and controlled by a selected condition of said trigger, means selectively conditioning said control tubes whereby assumption of said selected condition by its associated trigger renders one conditioned tube operative to relay an operative pulse to a higher trigger and assumption of said same condition when the other tube is conditioned renders it operative to relay an operative pulse to a lower trigger.

17. A device as in claim 16 and including carry triggers at both ends of said binary series for transferring a carry to a higher or to a lower order binary series respectively.

18. An electronic counter comprising a plurality of electronic triggers connected in seriatim, means conditioning said counter whereby operation of one trigger to a chosen one state of stability produces operation of the next trigger of the series, means adjustable to produce operation of the next trigger of the series only when a lower trigger is operated to the other state of stability whereby a subtractive recording is made, said means including an electronic switch and means conditioned by said switch for adding an additional increment when said counter is so adjusted to subtract.

19. An electronic divider comprising a divisor counter, a dividend counter set for subtraction and a quotient counter, a cyclically operable pulse emitter emitting a series of sequential timed pulses in each cycle, means controlled by said pulses for repeatedly doubling said divisor value, means automatically effective when said doubled value overflows said divisor counter to stop said doubling and to reset said emitter to an initial starting condition to condition said divisor counter for halving, means under control of one cycle of operation of said emitter for halving said divisor value and doubling any entered quotient value, electronic comparing means, transfer means controlled by said comparing means and transferring said divisor halved value to said dividend counter except when said comparing means are operated to indicate that the divisor halved value is greater than the dividend value, means for entering an increment of quotient value each time said divisor value is transferred, and means under control of said cyclically operating emitter repeatedly halving said divisor and doubling the accumulated value of said quotient comparing successive halved values with the dividend remainder and transferring said successive halved values to said dividend counter whenever a halved value is not greater than a dividend remainder and adding an increment of quotient value for each such transfer.

20. An electronic dividing machine comprising an electronic dividend counter set for subtraction of successive entries subsequent to an initial entry of a dividend entry therein, an electronic divisor counter operable to selectively double or halve an entered divisor value, means initially entering a divisor value therein, an electronic quotient counter for accumulating quotient increments and operable to double accumulated values therein, an electronic emitter operable cyclically to control successive division operations, an electronic comparing circuit for ascertaining an equality condition between said divisor and dividend values or a greater than or a lesser than relationship selectively in accordance with said respective values, a transfer circuit for transmitting a value standing in said divisor counter to said dividend counter except when said comparing circuit ascertains a greater than relationship, means cyclically controlled by said emitter to double said divisor value repeatedly until its value overflows the divisor counter capacity, means counting the number of doubling cycles, means effective upon such overflow to reset said cycle emitter and to initiate a halving of said divisor value and a doubling of said quotient value and rendering said comparing means operative to compare a first halved divisor with the original dividend value, said transfer means transferring said halved divisor value to said subtracting dividend counter except when the divisor is greater than the dividend, means entering a quotient increment accumulatively into said quotient counter each time said divisor is transferred, and means repeating said halving, comparing and selectively transferring cycles until the number of halving cycles equal the number of doubling cycles whereupon said quotient counter indicates the value of the dividend value initially entered divided by the initial divisor value.

21. An electronic divider comprising a divisor counter, a dividend counter set for subtraction and a quotient counter, a source of timed pulses, means controlled by said pulses for doubling an entered divisor value in steps, means entering a corrective value in said divisor counter, means blocking operation of the carry means of said divisor counter, means effective to enter a further corrective value in said divisor counter if said carry means have not been previously operated to indicate a carry requirement, means unblocking said carry means and producing all carries required, means controlled by said timed pulses for repeating said steps of doubling and correcting until the entry in said divisor counter overflows the counter, means thereupon effective in steps to halve said divisor value and double any entered quotient value, means producing any carry down required in said divisor counter said divisor counter being changed back to a doubling condition during said carry down only, means for comparing the halved divisor value with the dividend value, means effective when said divisor value does not exceed said dividend value to transmit said divisor value to said dividend counter to be subtracted from the dividend value entered therein and producing all required carries, means entering a unit increment in said quotient counter, means entering a corrective value in said dividend counter and in said quotient counter, means blocking operation of the carry means of said dividend and quotient counters, means controlled by the carry circuits of said dividend and quotient counters, respectively, to selectively control entry of an additional corrective value, in one chosen condition of one of said carry means and in the other condition of the other of said carry means, means producing all carries required.

22. In combination, ordered organizations of electronic means each organization including a plurality of cascade connected electron valve storage circuits each circuit storing a representation indicative of a bit of code and each organization for representing, in code, a single stored digit, multi-digit-amount determining means including means for individually directly operating each of the storage circuits and independently of its associated cascaded circuits in chosen combinations to thereby enter a digit in each order, and means including said individually operating means for again individually and directly operating the respective circuits of each order in the same or a different combination to enter an additional digit into the respective circuit of each order.

23. A device as in claim 22, said entry means including means for operating the respective circuits of each order independently in sequence, but all corresponding circuits in different orders, in parallel.

24. A device as in claim 22, and including means for controlling said entries whereby said entries are selectively made additively or subtractively.

25. A device as in claim 22, and including carry means between the respective orders.

26. A device as in claim 25, and including means for invariably entering a correction entry after each such additional value entry.

27. A device as in claim 26, said correction entry means including means controlled by said carry means for selectively entering or not entering a second correction entry under control of the condition of said carry means.

28. An electronic register comprising a group of cascade connected electronic triggers, means for individually directly operating each of said triggers independently of its associated cascaded triggers to represent by the code permutation of their altered conditions taken as a group an initially entered digit, and means for inserting an additional digit into said register to be accumulated with said first digit, said means including means for again individually operating said triggers directly and independently of its associated cascaded triggers, in code permutations, selectively in accordance with the digit to be entered.

29. A device as in claim 28, and including electron valve means settable to control said inserting means whereby said other value is selectively additively or subtractively entered.

30. A device as in claim 28, and including means for operating a selected trigger to insert a correction value subsequent to each such additional entry.

31. A register comprising four electron valve triggers connected in cascade, means for individually, independently operating said triggers in different permutations whereby the combined operation of the respective triggers is in accordance with a pattern corresponding to the value of the entry desired, means coupling each trigger to the next succeeding trigger, and means for selectively conditioning said coupling means whereby a second value entry into said register is made selectively, additively or subtractively.

32. A register comprising four cascade connected electron valve triggers, means for operating each of said triggers directly and independently of its associated cascaded triggers in selected permutations to introduce a value into said register, and means for again directly individually operating said triggers in a selected permutation indicative of a second value to be entered, said means including means for producing time separated operation of each of said four triggers.

33. An electronic register comprising a series of cascade connected electronic triggers, means for individually operating said triggers to represent by their altered conditions an initially entered value, means for inserting an additional value into said register to be accumulated with said first value, said means including means for individually operating said triggers, in permutations, in accordance with the value to be entered, carry means connected to said triggers for operation thereby, means for selectively operating said triggers to insert a correction value subsequent to each additional entry, and means controlled by said carry means for selectively entering or not entering an additional correction entry.

34. An electronic register comprising a series of cascade connected electronic triggers, means for individually operating said triggers to represent by their altered conditions an initially entered value, means for inserting an additional value into said register to be accumulated with said first value, said means including means for individually operating said triggers, in permutations, in accordance with the value to be entered, electron valve means settable to control said inserting means whereby said other value is selectively additively or subtractively entered, and carry means operated by said triggers when a subsequent subtractive entry produces a chosen pattern of operation of said individual triggers followed by a different pattern.

References Cited in the file of this patent

UNITED STATES PATENTS

| | | |
|---|---|---|
| 2,318,591 | Couffignal | May 11, 1943 |
| 2,386,481 | Lang | Oct. 9, 1945 |
| 2,394,924 | Luhn | Feb. 12, 1946 |
| 2,404,047 | Flory et al. | July 16, 1946 |
| 2,435,840 | Morton | Feb. 10, 1948 |
| 2,447,799 | Dickinson | Aug. 24, 1948 |
| 2,462,275 | Morton et al. | Feb. 22, 1949 |
| 2,500,294 | Phelps | Mar. 14, 1950 |
| 2,502,360 | Williams | Mar. 28, 1950 |
| 2,514,037 | Dickinson | July 4, 1950 |
| 2,536,955 | Palmer et al. | Jan. 2, 1951 |
| 2,539,623 | Heising | Jan. 30, 1951 |
| 2,587,979 | Dickinson | Mar. 4, 1952 |
| 2,604,262 | Phelps | July 22, 1952 |
| 2,641,696 | Woolard | June 9, 1953 |
| 2,666,575 | Edwards | Jan. 19, 1954 |

OTHER REFERENCES

"A Digital Computer for Scientific Applications," West and De Turk, Proc. I. R. E., December 1948; page 1457.